US008452704B2

(12) United States Patent
Barbara et al.

(10) Patent No.: US 8,452,704 B2
(45) Date of Patent: May 28, 2013

(54) METHOD AND SYSTEM FOR ON-LINE PAYMENTS

(75) Inventors: Ellen Barbara, Bedford, NY (US); Antony Jenkins, New York, NY (US)

(73) Assignee: Citicorp Credit Services, Inc., New York, NY (US)

( * ) Notice: Subject to any disclaimer, the term of this patent is extended or adjusted under 35 U.S.C. 154(b) by 920 days.

(21) Appl. No.: 09/903,284

(22) Filed: Jul. 11, 2001

(65) Prior Publication Data

US 2002/0016769 A1 Feb. 7, 2002

Related U.S. Application Data

(60) Provisional application No. 60/217,489, filed on Jul. 11, 2000, provisional application No. 60/219,088, filed on Jul. 18, 2000.

(51) Int. Cl.
*G06Q 40/00* (2006.01)

(52) U.S. Cl.
USPC .................................. 705/40; 705/39; 705/42

(58) Field of Classification Search
USPC ........................................................... 705/40
See application file for complete search history.

(56) References Cited

U.S. PATENT DOCUMENTS

| | | | | |
|---|---|---|---|---|
| 4,974,252 A | 11/1990 | Osborne | ......................... | 379/92 |
| 5,041,972 A | 8/1991 | Frost | ............................. | 364/401 |
| 5,383,113 A * | 1/1995 | Kight et al. | ................... | 364/401 |
| 5,406,584 A | 4/1995 | Erisman | .......................... | 375/45 |
| 5,426,281 A | 6/1995 | Abecassis | ..................... | 235/379 |
| 5,537,315 A | 7/1996 | Mitcham | ....................... | 364/408 |
| 5,659,469 A | 8/1997 | Deaton et al. | ................... | 705/14 |
| 5,664,115 A | 9/1997 | Fraser | ............................. | 705/37 |
| 5,689,100 A | 11/1997 | Carrithers et al. | ............. | 235/380 |
| 5,717,989 A | 2/1998 | Tozzoli et al. | ................... | 705/37 |
| 5,794,207 A | 8/1998 | Walker et al. | ...................... | 705/1 |
| 5,870,721 A | 2/1999 | Norris | .............................. | 705/38 |
| 5,890,138 A | 3/1999 | Godin et al. | .................... | 705/26 |
| 5,903,881 A * | 5/1999 | Schrader et al. | ................ | 705/42 |
| 5,920,847 A | 7/1999 | Kolling et al. | ................... | 705/40 |
| 5,924,083 A | 7/1999 | Silverman et al. | .............. | 705/37 |

(Continued)

FOREIGN PATENT DOCUMENTS

WO    WO 00/67177 A2 * 11/2000

OTHER PUBLICATIONS

Citibank.com, Oct. 13, 1999, Internet, pp. 1-5.*

(Continued)

*Primary Examiner* — Ojo O Oyebisi

(74) *Attorney, Agent, or Firm* — Eric L. Sophir; Dentons US LLP

(57) ABSTRACT

A method and system for making on-line payments makes use of computer hardware and software and utilizes, for example, a payment engine that facilitates the making of payments via the Internet. A user enrolls for the on-line payments service, designates a source account for the on-line payments, and is provided a transaction account as a money deposit account with an account number that the user can use as a source and a destination of funds and with one or more service levels. The user can make, for example, on-line payments, on-line and/or off-line purchases, cash withdrawals at an ATM, credit card account payments, bill payments, and/or international payments with funds in the transaction account and/or a line of credit associated with the transaction account.

62 Claims, 25 Drawing Sheets

U.S. PATENT DOCUMENTS

| | | | |
|---|---|---|---|
| 5,940,811 A | 8/1999 | Norris | 705/38 |
| 5,956,695 A | 9/1999 | Carrithers et al. | 705/14 |
| 5,999,915 A | 12/1999 | Nahan et al. | 705/27 |
| 6,018,722 A | 1/2000 | Ray et al. | 705/36 |
| 6,021,943 A | 2/2000 | Chastain | 235/379 |
| 6,023,686 A | 2/2000 | Brown | 705/37 |
| 6,029,150 A | 2/2000 | Kravitz | 705/39 |
| 6,084,528 A | 7/2000 | Beach et al. | 340/825.35 |
| 6,085,169 A | 7/2000 | Walker et al. | 705/26 |
| 6,088,686 A | 7/2000 | Walker et al. | 705/38 |
| 6,134,534 A | 10/2000 | Walker et al. | 705/26 |
| 6,202,051 B1 | 3/2001 | Woolston | 705/27 |
| 6,223,163 B1 | 4/2001 | Van Luchene | 705/1 |
| 6,240,396 B1 | 5/2001 | Walker et al. | 705/26 |
| 6,260,024 B1 | 7/2001 | Shkedy | 705/37 |
| 6,292,789 B1* | 9/2001 | Schutzer | 705/40 |
| 6,356,878 B1 | 3/2002 | Walker et al. | 705/26 |
| 6,567,768 B1 | 5/2003 | Matos et al. | 702/187 |
| 6,609,113 B1* | 8/2003 | O'Leary et al. | 705/39 |
| 6,954,734 B1 | 10/2005 | Kuelbs et al. | 705/26 |
| 7,006,993 B1 | 2/2006 | Cheong et al. | 705/38 |
| 7,103,568 B1 | 9/2006 | Fusz et al. | 705/26 |
| 7,249,055 B1 | 7/2007 | Elder | 705/26 |
| 2001/0018665 A1 | 8/2001 | Sullivan et al. | 705/14 |
| 2001/0039529 A1 | 11/2001 | Hoffman | 705/37 |
| 2001/0047308 A1 | 11/2001 | Kaminsky et al. | 705/26 |
| 2001/0047489 A1 | 11/2001 | Ito et al. | 713/202 |
| 2002/0010634 A1 | 1/2002 | Roman et al. | 705/26 |
| 2002/0019785 A1 | 2/2002 | Whitman | 705/28 |
| 2002/0026418 A1 | 2/2002 | Koppel et al. | 705/41 |
| 2003/0061170 A1 | 3/2003 | Uzo | 705/64 |
| 2003/0126094 A1 | 7/2003 | Fisher et al. | 705/75 |
| 2003/0195843 A1 | 10/2003 | Matsuda et al. | 705/39 |
| 2004/0002911 A1 | 1/2004 | Seilern | 705/37 |
| 2004/0024700 A1 | 2/2004 | Petigny | 705/39 |
| 2004/0064351 A1 | 4/2004 | Mikurak | 705/7 |
| 2004/0078328 A1 | 4/2004 | Talbert | 705/40 |
| 2004/0236613 A1 | 11/2004 | Lundberg | 705/4 |
| 2004/0267558 A1 | 12/2004 | Lundberg | 705/1 |
| 2005/0033688 A1 | 2/2005 | Peart et al. | 705/39 |
| 2005/0211765 A1 | 9/2005 | Brown et al. | 235/379 |
| 2005/0278215 A1 | 12/2005 | Seele, Jr | 705/14 |
| 2005/0283406 A1 | 12/2005 | Kuelbs et al. | 705/26 |
| 2006/0064380 A1 | 3/2006 | Zukerman | 705/44 |
| 2006/0178918 A1 | 8/2006 | Mikurak | 707/7 |
| 2006/0212393 A1 | 9/2006 | Brown et al. | 705/40 |
| 2006/0265602 A1 | 11/2006 | Robinson | 713/186 |
| 2007/0016533 A1 | 1/2007 | Fujimura | 705/65 |
| 2007/0045403 A1 | 3/2007 | Slonecker | 235/380 |

OTHER PUBLICATIONS

Stephen Nelson, Quicken '99 for Windows for Dummies, 1998, IDG Books, pp. 26-27, 96-111, 130-136, and 259.*
X.com, Mar. 2, 2000, archive.org, pp. 1-10.*
PayPal.com, Mar. 3, 2000, archive.org, pp. 1-5.*
Checkfree, Feb. 29, 2000, archive.org, pp. 1-5.*
Sun Trust website as of Feb. 18, 1999, Internet Archive, pp. 1-2.*
International Search Report for Application No. PCT/US01/21803, dated Oct. 24, 2001 (mailing date).
Beckett, Paul and Buckman, Rebecca, "Citigroup, Microsoft Sign Pact Allowing Online Transfers," *The Wall Street Journal*, May 1, 2001.
PayPal, "About Us" [online], Copyright 2000 [retrieved on Oct. 31, 2000], 1 p. Retrieved from the Internet: http://www.paypal.x.com/cgi-bin/webscr?cmd=p/gen/about-outside.
Hill, Austin, "PayPal Digital Money" [online], Jul. 23, 1999 [retrieved on Oct. 31, 2000], 2 pp. Retrieved from the Internet: http://www.mail-archive.com/cypherpunks@toad.com/msg03295.html.
cbase, "Overview" [online], Copyright 1997-2000 [retrieved on Oct. 31, 2000], 1 p., Retrieved from the Internet: http://www.c-base.com/about-01.html.
cbase, "Overview" [online], Copyright 1997-2000 [retrieved on Oct. 31, 2000], 1 p., Retrieved from the Internet: http://www.c-base.com/ecommerce-01.html.
chase, "Overview" [online], Copyright 1997-2000 [retrieved on Oct. 31, 2000], 1 p., Retrieved from the Internet: http://www.c-base.com/partnership-01.html.
cbase, "History" [online], Copyright 1997-2000 [retrieved on Oct. 31, 2000], 1 p., Retrieved from the Internet: http://www.c-base.com/about-02.html.
"Alladvantage.com Teams with Ecount to Provide Online Payment Accounts and Debit Cards to Members," Press Release, Aug. 8, 2000 [retrieved on Oct. 31, 2000], 3 pp., Retrieved from the Internet: http://www.c-base.com/about_press080800.html.
Ecount, "webcertificate.com" [online], Copyright 1998-2000 [retrieved on Oct. 31, 2000], 1 p., Retrieved from the Internet: http://www.webcertificate.com/webcert/.
Spangler, Todd, "Start-Up Touts Mobile Cash Transfer System" [online], Nov. 15, 1999 [retrieved on Oct. 31, 2000], *Inter@ctive Week*, 3 pp., Retrieved from the Internet: http://www.zdnet.com/intweek/stories/news/0%2C4164%2C2394658%2CO.html.
Raik-Allen, Georgie, "Investors Beam Funding to Confinity" [online], Jul. 23, 1999 [retrieved on Oct. 31, 2000], 3 pp., Retrieved from the Internet: http://www.herring.com/insider/1999/0723/vc-confinity.html.
Affinity Technology Group, Inc. [online], Copyright 2001 [retrieved on Jan. 14, 2002], 13 pp., Retrieved from the Internet: http://www.affi.net/.
Maritz, Inc. [online], Copyright 1995-2002 [retrieved on Jan. 14, 2001], 19 pp., Retrieved from the Internet: http://www.maritz.com/.
Ecount [online], Copyright 2000-2001 [retrieved on Jan. 14, 2002], 5 pp., Retrieved from the Internet: http://www.ecount.com/.
BankOne, eMoneyMail [online], Copyright 2002 [retrieved on Jan. 14, 2002], 6 pp., Retrieved from the Internet: http://www.bankone.com/presents/emoneymail/home/default.asp.
Preliminary Examination Report for Application No. PCT/US01/21803, dated Jul. 19, 2005 (mailing date).
"eBay Launches the Most Comprehensive Trust and Safety Upgrades to the World's Largest Person-To-Person Trading Site", Jan. 15, 1999, PR Newswire.
"Online Auctions Named No. 1 Internet Fraud Complaint for 1998," Feb. 23, 1999, U.S. News Wire.
Press Release, "Web Alliance Sets Tough New Standards for Internet Auctions and Classifieds, As Consumer Sites Team up to Make Person-To Person Buying and Selling Safer," PR Newswire; New York, Dec. 2, 1998, extracted on Internet on Sep. 17, 2004.
Notification of Transmittal of the International Search Report or the Declaration for PCT/US00/18582 and the corresponding International Search Report dated Oct. 3, 2000.
Deutsche 24 and eBay to Co-operate on Internet Auctions (Deutsche 24 and eBay kooperieren bei Internet-Auktionen), Borsen-Zeitung, Mar. 23, 2000, p. 8.
"Paybyweb.com Offers Consumer-Safe Transaction Processing to Buyers and Sellers on ebay.com and Other Auction Sites," Business Wire, Aug. 5, 1999.
Sellers Get a Wider Audience and Buyers Don't Have to Leave Their Offices or Farms, Rick Barrett, Madison Newspapers, Feb. 15, 1998.
www.ebay.com, Jul. 2, 1999, 12 pages.
www.ebay.com, Nov. 2, 2000, 18 pages.

* cited by examiner

International Check

| Field | Value | Field | Value |
|---|---|---|---|
| From Account# | XXXXXXXXXXXX2344 | Amount in Foreign Currency | 12378.78 |
| From Account Nickname | Joe's Chase | Exchange Rate | 8.2563 |
| To Name | Josef LeDoux | Check Number | 10758 |
| To Address 1 | 12 Rue de la Paris | Status | Cashed |
| To Address 2 | Paris | Transaction Time | 08:52:15 |
| To Address 3 | France | Funds Available Date | 12/10/00 |
| Phone Number | 98-2-123-1545 | Status Change Date | 12/10/00 |
| Currency | Francs | | |

Messages

[Cancel] [Copy Request] [Close]

FIG. 10

International Wire Details — 82

| Field | Value | Field | Value |
|---|---|---|---|
| From Account# | XXXXXXXXXXXX2344 | Currency | Francs |
| From Account Nickname | Joe's Chase | Amount in Foreign Currency | 12378.78 |
| To Name | Josef LeDoux | Exchange Rate | 1.2569 |
| Bank Routing Number | 123456789 | Status | Sent |
| Bank Account Number | 9876543 | Transaction Time | 08:52:15 |
| Bank Address 1 | Bank of France | Funds Available Date | 12/10/00 |
| Bank Address 2 | Paris, France | Status Change Date | 12/10/00 |
| Swift Code | abc123 | | |

Messages

[ Close ]

FIG. 11

International iACH Details

| From Account# | XXXXXXXXXXXX2344 | Currency | Francs |
| From Account Nickname | Joe's Chase | Amount in Foreign Currency | 12378.78 |
| To Name | Josef LeDoux | Exchange Rate | 1.2569 |
| Bank Routing Number | 123456789 | Status | Sent |
| Bank Account Number | 9876543 | Transaction Time | 08:52:15 |
| Bank Address 1 | Bank of France | Funds Available Date | 12/10/00 |
| Bank Address 2 | Paris, France | Status Change Date | 12/10/00 |

Messages

Close

FIG. 12

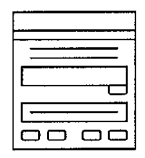
Account Page
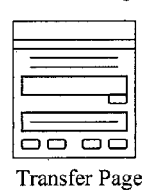
Transfer Page
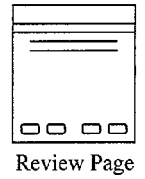
Review Page
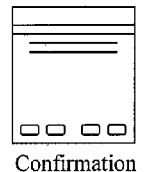
Confirmation
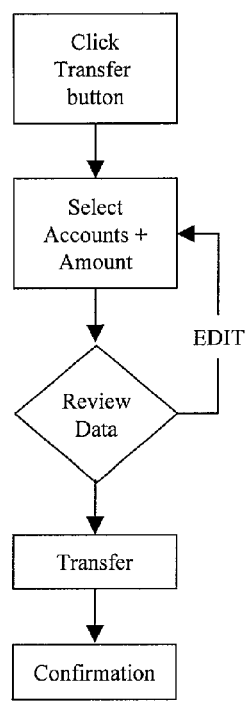
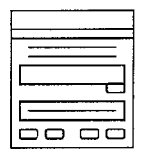
Account Page
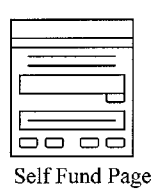
Self Fund Page
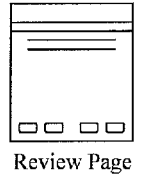
Review Page
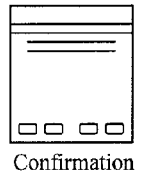
Confirmation
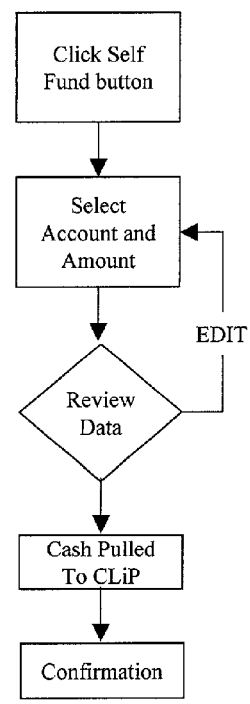
FIG. 18         FIG. 19

METHOD AND SYSTEM FOR ON-LINE PAYMENTS

PRIORITY APPLICATION

This application claims the benefit of U.S. Provisional Application No. 60/217,489 filed Jul. 11, 2000, entitled "Method and System for On-Line Person-to-person Payments (Person-to-Person Functionality)" and U.S. Provisional Application No. 60/219,088 filed Jul. 18, 2000, entitled "Method and System for On-Line Person-to-person Payments (Person-to-Person Functionality)" which are incorporated herein by this reference.

CROSS REFERENCE TO RELATED APPLICATIONS

This application relates to U.S. Utility Application Ser. No. 09/610,540 filed Jul. 7, 2000, entitled "Method and System for Managing and Conducting a Network Auction" and U.S. Provisional Application No. 60/143,021 filed Jul. 9, 1999, entitled "Method and System for Managing and Conducting a Network Auction," which are incorporated herein by this reference.

FIELD OF THE INVENTION

The present invention relates generally to the field of electronic commerce and more particularly to a method and system for making on-line payments utilizing a transaction account as a hub for such payments.

BACKGROUND OF THE INVENTION

Currently, on-line consumers have limited ability to facilitate payments between two individuals other than by an individual check by mail, which is the present paying paradigm. So, for example, in the on-line auction context, payments are actually being made person-to-person via check or money order. It takes an inordinate amount of time to clear checks through the current Automated Clearing House (ACH) systems, which slows down the purchasing process considerably via the on-line auction context. In addition, there is a need for consumers to be able to facilitate person-to-person payments, for example, to facilitate birthday presents or reimbursement of funds that were spent without a merchant being involved that eliminates the necessity for consumers to use paper checks or cash as the payment vehicle between two individual parties. Presently, there is a focus of efforts on promotion of person-to-person payments, for example, through on-line auction web sites in which person-to-person payment providers are very focused on the facilitation of payments between two individuals. However, such efforts do not include other payment mechanisms, such as bill payments, on-line and off-line purchases, cash withdrawals, credit card account payments, and/or international payments.

SUMMARY OF THE INVENTION

It is a feature and advantage of the present invention to provide a method and system for on-line payments which enables the making of payments using any of a credit card or a checking account or savings account to facilitate an online transaction.

It is another feature and advantage of the present invention to provide a method and system for on-line payments which enables a user to view all of a user's financial information in one space using aggregating technology.

It is an additional feature and advantage of the present invention to provide a method and system for on-line payments that enables a user to facilitate the payment of bills and the presentment of the user's bills via the Internet.

It is a further feature and advantage of the present invention to provide a method and system for on-line payments that gives users a single place to go to be able to transact all of their payments, such as payments to merchants and/or individuals.

It is a still further feature and advantage of the present invention to provide a method and system for on-line payments which utilizes a transaction account as a hub, which is a repository for the flow of funds into and out of the account, that enables a customer to have funds reside in the transaction account and to transmit funds from that account to others.

It is another feature and advantage of the present invention to provide a method and system for on-line payments, which allows a user to designate a credit card account or a deposit account as a source account for withdrawing funds for the on-line payments.

It is a further feature and advantage of the present invention to provide a method and system for on-line payments utilizing a transaction account, which functions as a money deposit account with an account number, that the user can use as a source and a destination of funds and with one or more service levels.

It is another feature and advantage of the present invention to provide a method and system for on-line payments that enables the transfer of funds between accounts regardless of the financial institution.

It is an additional feature and advantage of the present invention to provide a method and system for on-line payments that also enables the user to make on-line and off-line purchases, to withdraw cash, to make bill payments, and to make international payments with funds in the transaction account.

To achieve the stated and other features, advantages and objects, an embodiment of the present invention makes use of computer hardware and software and utilizes, for example, a payment engine that facilitates the making of payments via the Internet. The present invention enables the making of such payments between individuals using their credit cards, checking accounts and/or savings accounts to facilitate an on-line person-to-person transaction. Another aspect of the present invention enables a user to view all of the user's financial information in one space using aggregating technology. Additional aspects of the present invention enable a user to facilitate making on-line and off-line purchases, withdrawing cash, making bill payments, and making international payments via the Internet. The present invention leverages the customer service facilities of a financial institution, such as the financial institution's bank cards organization to handle 24×7 live person customer service and secure on-line customer service.

In an enrollment aspect of the on-line payment method and system for an embodiment of the present invention, enrollment information is received by the system from a user via an enrollment page for the on-line payments service. The information is received from the user in response to prompts and includes, for example, information about the user necessary to fulfill a "know your customer" (KYC) obligation of a financial institution as a provider of the on-line payments service and to enable the financial institution to validate that the user is bona fide. The information received from the user in response to such prompts is also relevant in settling disputes related to use of the on-line payments service by the user.

In response to further prompts by the system for an embodiment of the present invention, the user designates a source account for use in the on-line payments service from which funds can be withdrawn, for example, to make online payments. The source account designated by the user can be, for example, a credit card account and/or a deposit account of the user. If a credit card account is designated, the user is prompted to enter information about the credit card account, such as a credit card number, a credit card expiration date, and/or a credit card verifier. The system retains that information as it does not have to be entered again. The system performs a back end authorization to confirm that the received information relates to a valid credit card account of the user, and the user is ready to transact via the on-line payments service.

If a deposit account, such as checking account, a debit account, and/or a money market account of the user, is designated as the source account, the user is prompted to enter information about the deposit account, such as a deposit account number and/or an American Bankers Association (ABA) number of a financial institution with which the deposit account is maintained. The system likewise performs a back end validation to confirm that the user is the owner of the designated deposit account, and the user is likewise ready to transact via the on-line payments service.

In the on-line payments system and method for an embodiment of the present invention, the enrolled user is provided a transaction account, which functions as a money deposit account with an account number, that the user can use as a source and a destination of funds and with one or more service levels. The transaction account service levels include, for example, a first or basic service level that provides a person-to-person payment service enabling the user to receive and send funds from the user's transaction account. At the first or basic service level, the transaction account includes a save for later feature that enables the user to accumulate a balance of funds in the user's transaction account for later use. In addition, the transaction account at the first or basic service level includes a held money feature for retaining funds in the user's transaction account which the user has designated to be sent to a recipient but which have not yet been picked up by the recipient.

The transaction account service levels also include, for example, a second or premium service level that provides all the features of the first level of service plus an access card that enables the user to access funds in the user's transaction account for off-line transactions. In addition, the transaction account service levels also include, for example, a third or ultimate service level that provides all the features of the first and second levels of service plus a credit line that enables the user to access both line of credit funds and accumulated balance funds in the user's transaction account. In addition, the access card that is provided in connection with the second and third levels of service allows the user to withdraw funds from the transaction account, for example, at a self-service financial transaction terminal, such as an automatic teller machine (ATM).

The user is allowed to have funds reside in the transaction account for an embodiment of the present invention and to utilize the transaction account as a hub for user transactions. For example, the user can use the trust account for receiving person-to-person payments, and the user can fund the transaction account with funds withdrawn from the designated source account, such as the designated credit card account or one or more of the designated deposit accounts of the user. The funds residing in the user's transaction account are held, for example, in a save for later portion of the account for accumulating funds and/or a held money portion of the transaction account for funds designated by the user for a payment which has not been picked up by the recipient, and the user can view balances of both portions from time to time.

In the on-line payment method and system for an embodiment of the present invention, the user can use the funds residing in the transaction account, for example, for making on-line payments, on-line purchases, off-line purchases, cash withdrawals, credit card account payments, bill payments, and/or international payments with funds in the transaction account. For an on-line payment, for example, funds in the transaction account are designated for the online payment to a recipient according to an instruction by the user. The user can make an on-line purchase, for example, by authorizing payment to an on-line merchant for an on-line transaction by furnishing the on-line merchant the transaction account number. The user can also make an off-line purchase by authorizing payment to an off-line bricks and mortar merchant using a transaction card provided to the user in connection with the transaction account. Alternatively, the user can withdraw funds in cash from the transaction account at a self-service financial transaction terminal with the transaction card.

Further, the user can use the funds in the transaction account for making a credit card account payment by authorizing the payment to the user's credit card account, for making a bill payment through a bill payment service, and/or for making an international payment through an international payment service. The user can use the save for later portion of the funds in the transaction account for any of such transactions, or if the user qualifies for and requests a line of credit in connection with the transaction account, the user can supplement the save for later portion with the line of credit for such transactions.

Additional objects, advantages and novel features of the invention will be set forth in part in the description which follows, and in part will become more apparent to those skilled in the art upon examination of the following, or may be learned by practice of the invention.

BRIEF DESCRIPTION OF THE DRAWINGS

FIG. 10 shows a sample user interface screen for an international check payment aspect of an embodiment of the present invention;

FIG. 11 shows a sample user interface screen for an international wire payment aspect of an embodiment of the present invention;

FIG. 12 shows a sample user interface screen for an international ACH payment aspect of an embodiment of the present invention;

FIGS. 18 and 19 are schematic flow charts which illustrate examples of the transfer and self fund module for an embodiment of the present invention;

DETAILED DESCRIPTION

Referring now in detail to an embodiment of the invention, an example of which is illustrated in the accompanying drawings, an embodiment of the present invention makes use, for example, of a payment engine that facilitates the making of payments between two individuals, such as someone who wants to send money to a child at college, via the Internet. A person-to-person aspect of an embodiment of the present invention enables the making of such payments between individuals without the necessity of using, for example, checking accounts or savings accounts to fund those payments. The person-to-person aspect allows two people to use their credit cards, for example, to facilitate an online person-to-person transaction. An embodiment of the present invention makes use of an engine built, for example, on a bank cards technology platform of a financial institution, such as a bank, which enables features, such as allowing users to purchase at on-line merchants using monies that they received as cash in a person-to-person transaction.

Figure 1:
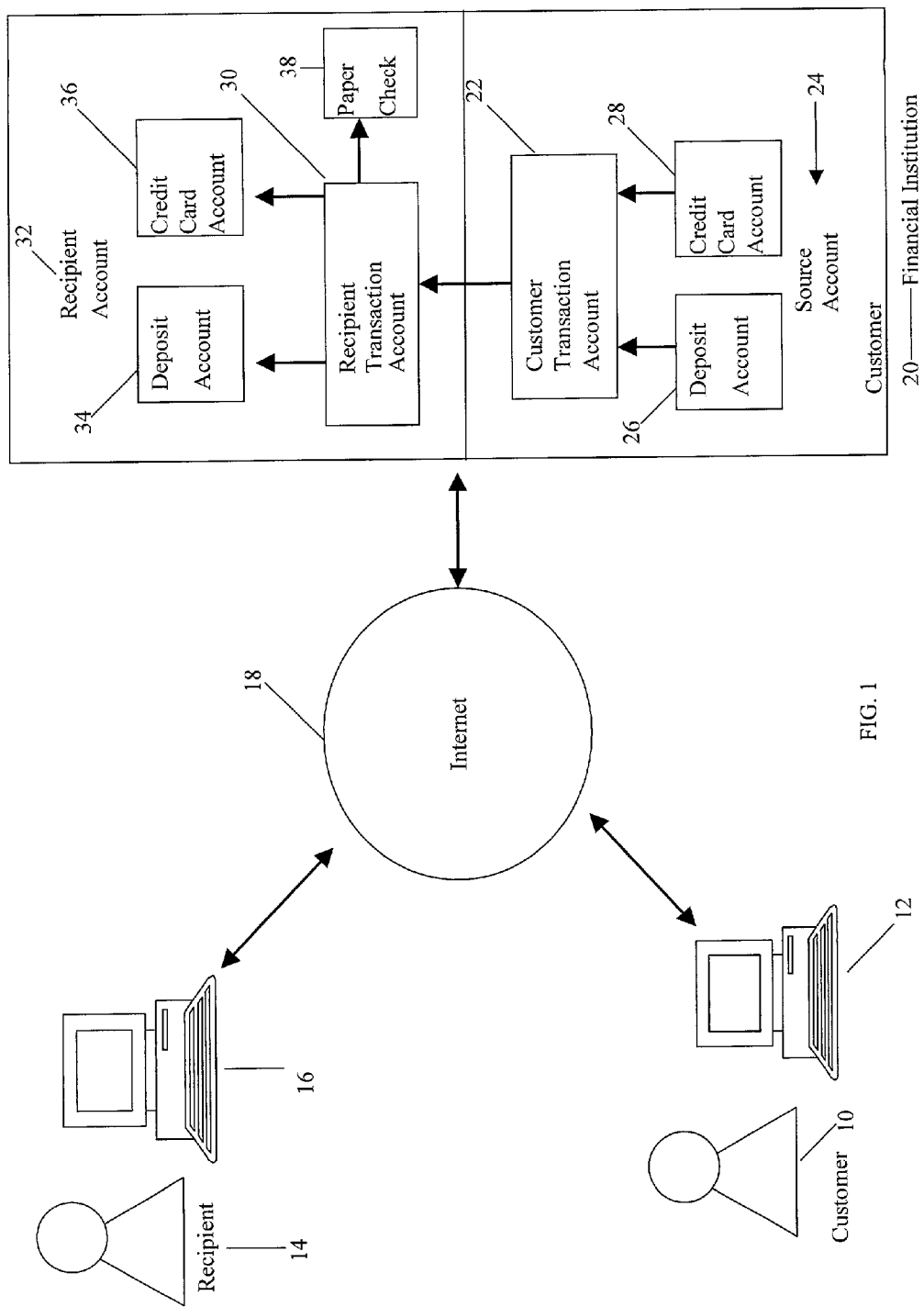
FIG. 1 is a schematic flow diagram that illustrates an overview of an example of key components and the flow of information between key components for a person-to-person payment aspect of an embodiment of the present invention.

FIG. 1 is a schematic flow diagram that illustrates an overview of an example of key components and the flow of information between key components for a person-to-person payment aspect of an embodiment of the present invention. Referring to FIG. 1, key components include, for example, a customer 10 at a terminal 12, such as the customer's personal computer (PC), and a recipient 14 at a terminal 16, such as the recipient's PC, coupled via the Internet 18 to a service provider, such as a financial institution 20. Other key components include, for example, a customer's transaction account 22 and a source account 24, such as deposit account 26 and/or credit card account 28, and a recipient's transaction account 30 and a recipient account 32, such as deposit account 34 and/or credit card account 36.

Referring further to FIG. 1, when the customer 10 is enrolled into the service for an embodiment of the present invention, the customer 10 is assigned a "pass-through" or transaction account 22, which is a repository for the flow of funds into and out of the account, depending upon the transactions in which the customer 10 engages. Thus, the customer 10 that registers for the service is able to have funds reside in the transaction account 22 and to transmit funds from that account 22 to other users, such as recipient 14, once the recipient is also enrolled. It is not necessary for the recipient 14 of funds to have a credit card account 36 or a bank account 34. If the recipient 14 of funds does not have a credit card account 36 or a bank account 34 and chooses not to register for the service, a courtesy check 38 is issued by the system of the present invention for the funds that are received. However, the sender 10 of funds needs a source account 24, such as a debit or checking account 26, or a credit card account 28 as the source of funds.

Figure 2:
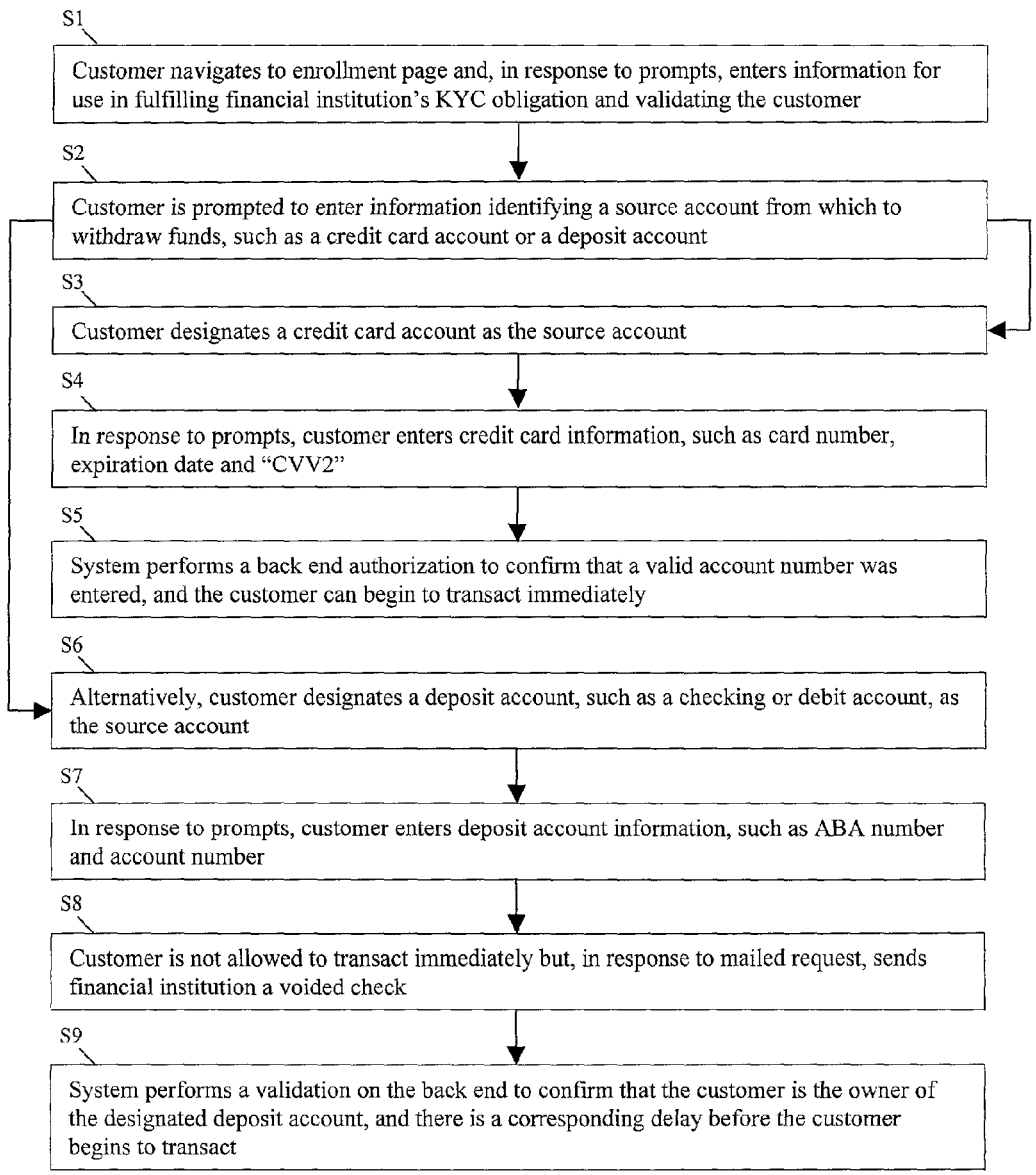
FIG. 2 is a flow chart which shows an example of the enrollment process for the person-to-person payment aspect of an embodiment of the present invention.

A feature of the person-to-person payment aspect of the present invention is an enrollment process. FIG. 2 is a flow chart which shows an example of the enrollment process for the person-to-person payment aspect of an embodiment of the present invention. Referring to FIG. 2, assume that a potential customer sees an advertisement for the service for an embodiment of the present invention on his or her Internet service provider's web site. At S1, the customer 10 is brought to an enrollment page where the customer 10 is asked to enter some critical information. The information is necessary to fulfill the financial institution's "know your customer" (KYC) obligation, and the information is also relevant, for example, in settling disputes. Critical information is collected from the customer 10 at the front end to secure as much information as is necessary to abide by KYC rules and to enable the financial institution 20 to have enough information to validate that the customer 10 is in fact a good faith, legitimate individual. In addition, the financial institution 20 makes use of a series of protection safeguards leveraging the financial institution's bank card database to deal with money laundering and fraud issues, including monitoring on a daily and weekly basis.

Referring further to FIG. 2, At S2, the customer 10 is also asked to enter information identifying a source account 24, which is the source from which the customer 10 intends to withdraw the funds. The source account 24 choices include, for example, credit card accounts, such as credit card account 28, and debit or checking accounts, such as deposit account 26. At S3, if the customer 10 designates a credit card account, such as credit card account 28, at S4, the customer 10 is also asked to enter critical information, such as the card number, the expiration date, and a card verification value (CVV2), which is an identifier on the reverse side of the credit card as a security feature that allows the system to know that the customer 11 has the card present in his or her immediate possession. When the credit card information is entered, at S5, the system performs a back end authorization to confirm that a valid account number was entered.

Referring again to FIG. 2, alternatively, at S6, if the customer 10 chooses, for example, a deposit account 26, such as a checking account, as the source account 24, at S7, the customer 10 must provide information, such as the ABA number and account number of the deposit account 26 that is designated. The designated bank can be any bank that has a valid ABA number or any bank that is a member of the ACH or any other valid account, such as a mutual fund money market account. If the customer 10 designates a demand deposit account (DDA) as the source of finds, the customer 10 is not allowed to transact immediately. Instead, at S8, the customer 10 is sent information in the mail asking the customer 10 to attach a voided check, so that at S9, the system can perform a validation on the back end to confirm that the customer 10 is the owner of the deposit account 26 that is designated. Thus, there is a delay of from a week to ten days before the customer 10 can use his or her checking account 26 as the source account 24.

Figure 3:
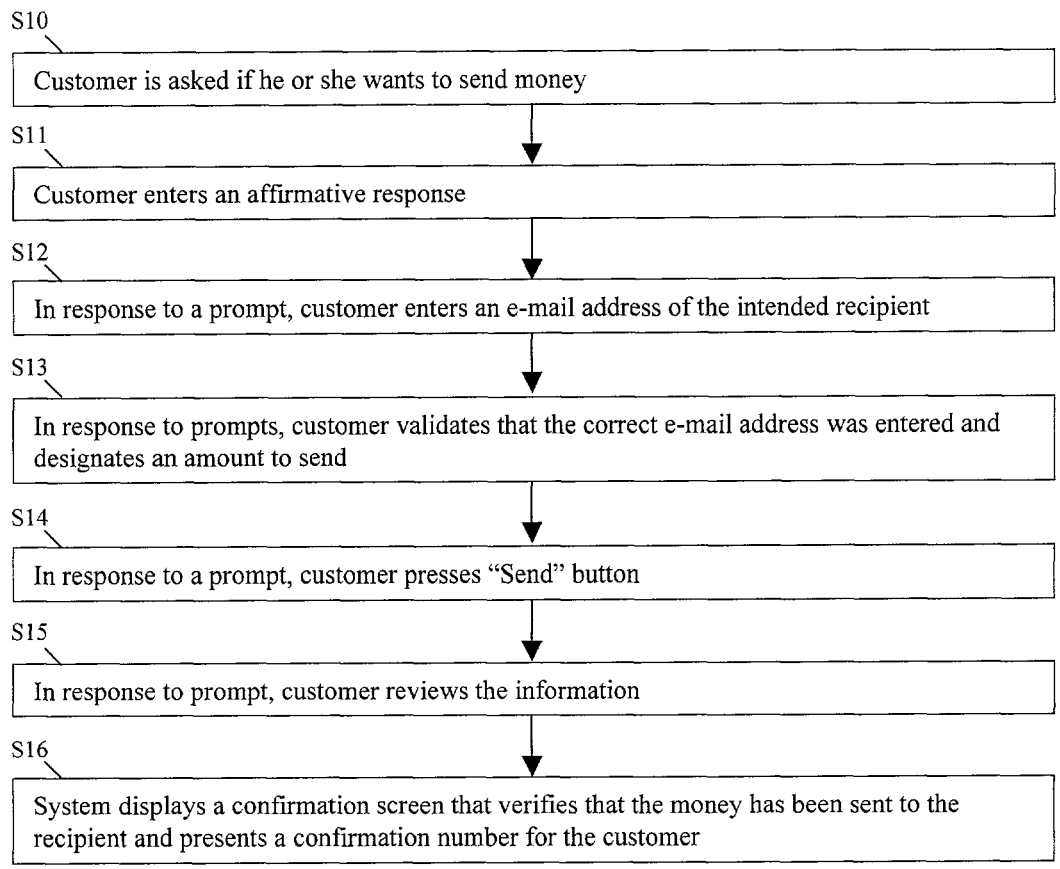
FIG. 3 is a flow chart which illustrates an example of the person-to-person payment process for an embodiment of the present invention.

FIG. 3 is a flow chart which illustrates an example of the person-to-person payment process for an embodiment of the present invention. If the customer 10 designates a credit card account 28 as the source account 24 for the funds, the customer 10 can start to transact immediately after entering the information. Referring to FIG. 3, when the credit card information is entered and the system performs the back end authorization to confirm that a valid account number was entered, at S10, the customer 10 is asked if he or she wants to send money. At S11, if the customer 10 responds in the affirmative, at S12, the customer 10 is asked to enter an e-mail address of the intended recipient 14. At S13, the customer 10 is asked to validate that the correct e-mail address was entered and to designate an amount. At S14, the customer 10 presses "Send" and is asked to review the information at S15. At S16, the system then displays a confirmation screen that verifies that the money has been sent to the recipient 14 and presents a confirmation number for the customer 10.

Figure 4:
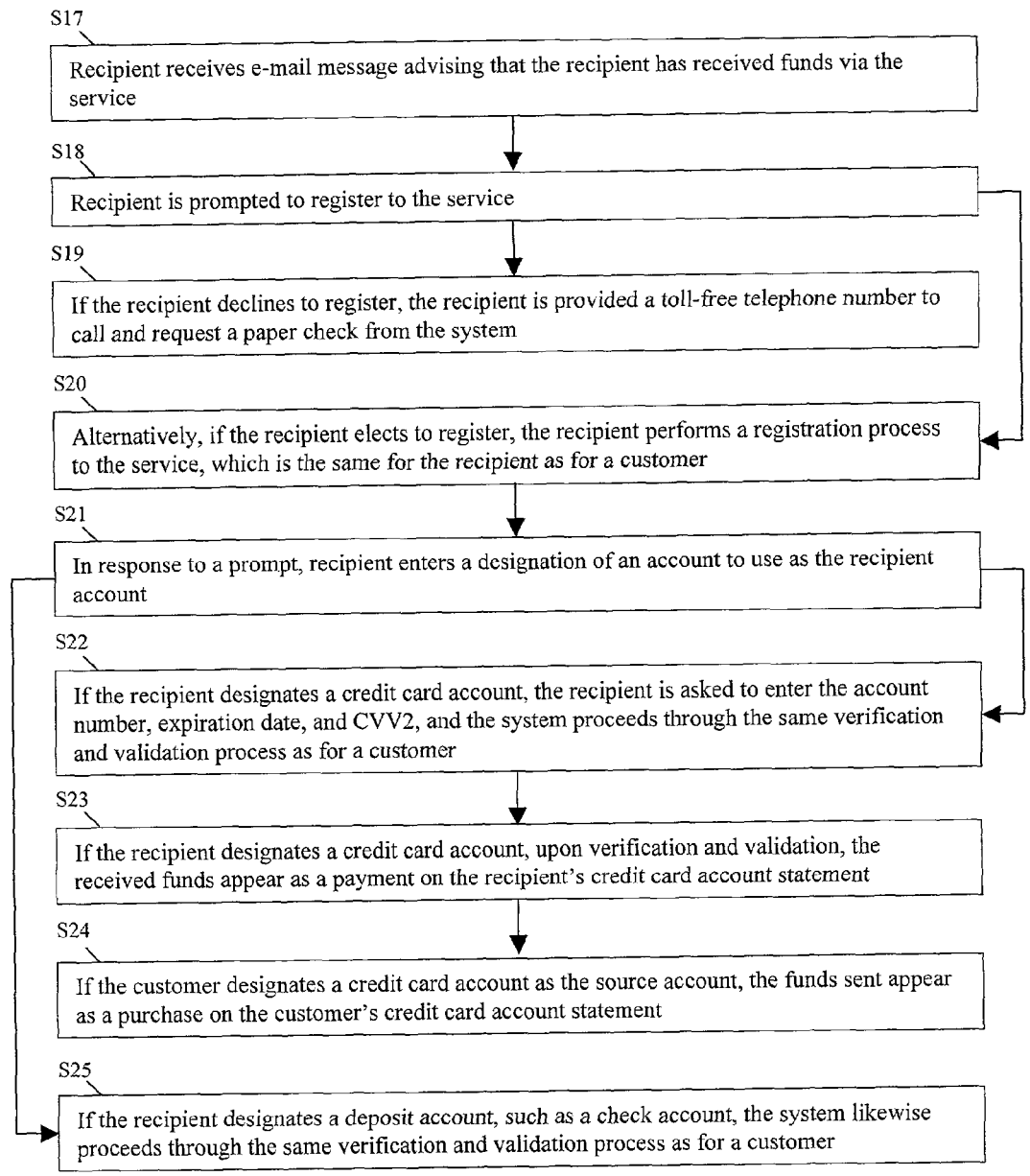
FIG. 4 is a flow chart which shows an example of the process of receiving a person-to-person payment for an embodiment of the present invention.

FIG. 4 is a flow chart which shows an example of the process of receiving a person-to-person payment for an embodiment of the present invention. Referring to FIG. 4, while the recipient 14 is browsing through the recipient's e-mail, for example, at S17, the recipient 14 discovers that he or she has an e-mail message advising that the recipient 14 has received the funds. At S18, the recipient 14 is asked to register to the service of the present invention to receive the funds. If the recipient 14 does not want to enroll in the system, at S19, the recipient 14 is provided, for example, with a 1-800 telephone number to call and request a check 38 from the system. Thus, the system does not hold a recipient's money hostage, and the money is made available to the recipient 14 with proper checks and balances. If the recipient 14 elects to register, at S20, the recipient 14 performs a registration process which is the same for the recipient 14 as for the customer 10. Once the recipient 14 completes the registration process, at S21, the recipient 14 is able to designate which account he or she wants to use as the recipient account 32. If the account designated by the recipient 14 is a credit card account 36, at S22, the recipient 14 is asked to enter the account number, the expiration date, and the CVV2.

Referring further to FIG. 4, if the recipient 14 enrolls and designates a credit card account 36 as the recipient account 32, at S23, the money appears as a payment on the recipient's credit card statement. This is an important feature, which means, for example, that there is no degradation of points or cash back. On the other hand, if the customer 10 designates the customer's credit card account 28 as the source account 24, at S24, the payment shows up as a purchase on a statement for the designated credit card account 28. This is also an important feature, which means, for example, that it does not appear as a cash advance with associated fees and interest. If the recipient 14 designates a checking account 34, at S25, the system proceeds through the same verification and validation process as it did for the customer 10, in order to minimize the opportunity for fraud. Thus, the enrollment process is the same for both a customer 10 and a recipient 14.

A merchant payments aspect of an embodiment of the present invention introduces deposit account functionality and debit card functionality, which enables purchases to be made at merchants directly, for example, from the recipient transaction account 30. For example, assume that the recipient 14 is sent a birthday gift of $50 via the person-to-person functionality of the present invention. In the merchant payments aspect, the recipient 14 is able to accept the $50 gift that was received and deposit the gift, for example, into a corresponding checking account 34, or apply the gift against the recipient's credit card account 36, or use the $50 gift to shop at a web site on line, or actually go to a retail store and make a $50 purchase with the gift. For example, assume that the customer 10 sends $50 to the recipient 14 as a birthday gift via the system for an embodiment of the present invention. The recipient 14 is sent an email notifying the recipient 14 of receipt of the money from the customer 10, and the recipient 14 logs into the system to pick up the $50 gift, for example, with a "Happy Birthday" message attached. The $50 gift is then held in the recipient's account 30 with the system, and the recipient 14 can do any one of a number of things with it. For example, the recipient 14 can leave the $50 gift in the account 30 until the recipient 14 accumulates the rest of the birthday gifts that the recipient 14 anticipates receiving.

Figure 5:
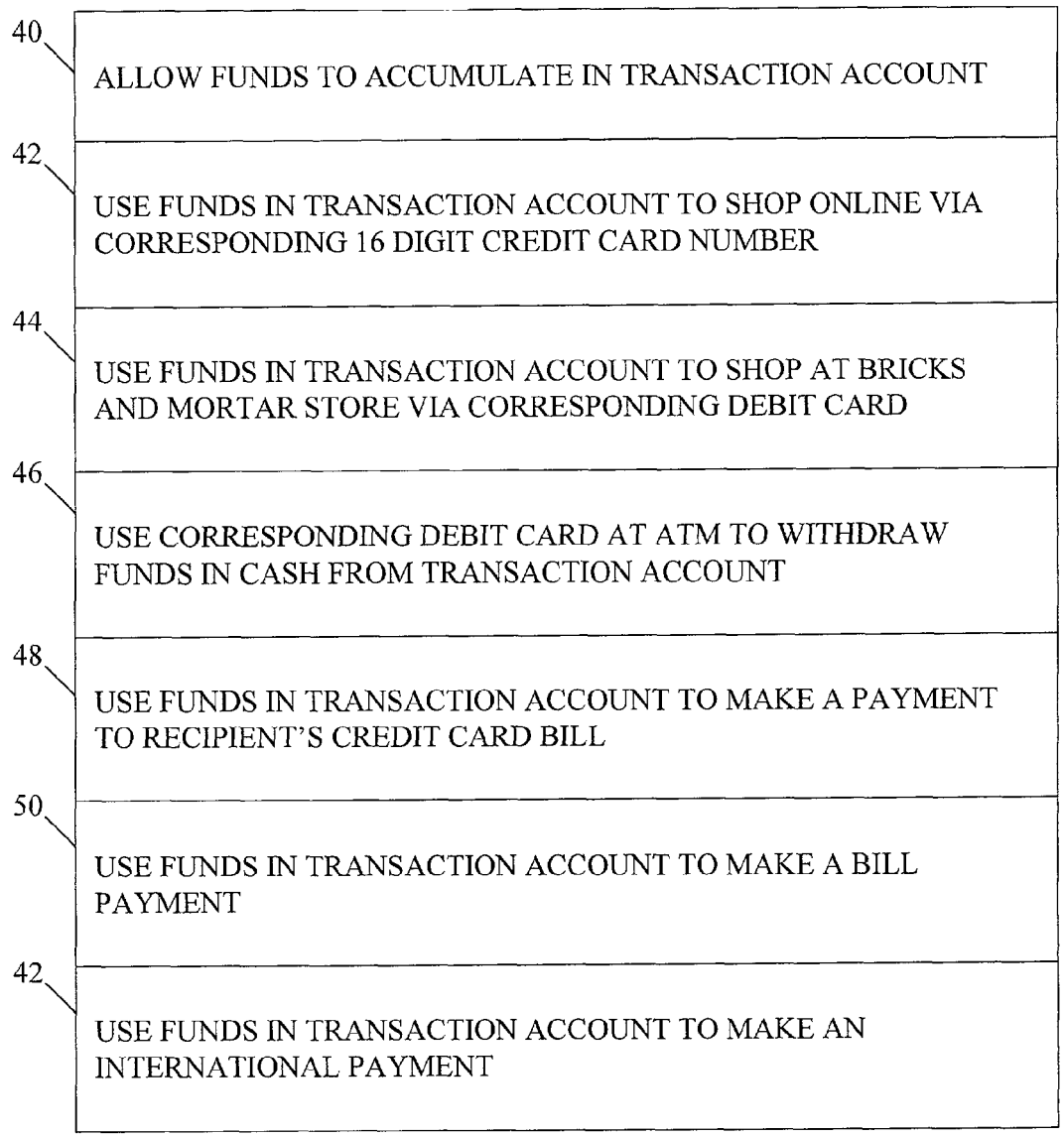
FIG. 5 is a table which illustrates examples of uses of funds in the transaction account for an embodiment of the present invention.

FIG. 5 is a table which illustrates examples of uses of funds in the transaction account for an embodiment of the present invention. Referring to FIG. 5, options of the recipient 14 include, for example, accumulation 40, on-line shopping 42, bricks and mortar store shopping 44, ATM cash withdrawal 46, credit card account payment 48, bill payment 50, and international payment 52. The recipient 14 can simply leave the $50 gift in the account 30 in anticipation of doing something with it later. The recipient 14 can spend the $50 gift, for example, via an on-line purchase by using a 16 digit credit card number that corresponds to the account 30 that is issued to the recipient 14 at the time the recipient enrolls in the service. The recipient 14 can take a debit card that is issued to the recipient at enrollment to a bricks and mortar retail merchant, such as a supermarket, gas station, or retail outlet, and shop with the $50 gift. The recipient 14 can also go to an ATM, and for a fee, withdraw the $50 gift, or whatever remains of it, from the ATM. Alternatively, the recipient 14 can use the $50 gift to pay the recipient's credit card bill account balance or make a payment to the recipient's credit card account 36, if the recipient 14 does not have a balance.

The transaction account 30 for an embodiment of the present invention enables the recipient 14 to save or accumulate the money that is received. The transaction account 30 is a depository account subject to all of the rules and regulations of any bank account. It is an account with an account number that can be used, for example, to make purchases from a merchant by furnishing the merchant the account number. Users who qualify are given, for example, a 16 digit debit card, which can be used in an ATM to withdraw cash. The recipient 14 can either shop on-line or take the plastic card to a merchant store to shop. An embodiment of the present invention enables the recipient 14 to receive a payment from another person, such as customer 10, and to use the payment for shopping 44 or to withdraw the payment in cash 46 at an ATM for a fee. The transaction account 30 functions as a hub for all of these transactions, whether the recipient 14 receives a person-to-person payment, for example, as a birthday present or uses the recipient's own checking account 34 to fund the transaction account 30. The transaction account 30 is the hub through which payments can be made, for example, to another person for an auction purchase or shopping web site 42, or for a purchase through the debit card at a local retail store 44, or for an international payment 52.

In the method and system for an embodiment of the present invention, the transaction accounts 22 or 30 become the hub in a butterfly concept, which utilizes a variety of funding sources, designated generally as 24 on the customer side and 32 (recipient account) on the recipient side in FIG. 1. The system provider can be a financial institution 20, such as a bank, and the funding sources 24, 32 can be banking accounts with the service providing bank or with other financial institutions or banks. It is not necessary for a customer, such as customer 10 or recipient 14, that uses the system to have banking accounts with the service providing bank 20. The customers 10 or 14 register a series of accounts that can be used as funding sources 24 or 32, and the monies that the customers 10 or 14 fund goes into the customers' transaction accounts 22 or 30. The funds can then be sent from the transaction accounts 22 or 30, according to the customers' instructions, for example, to other individuals, such as from customer 10 to recipient 14 (or vice versa), to charities, to pay the customers' bills, to make payments on the customers' credit cards, for deposit into another checking account at another institution, to shop, or to get the cash out of an ATM. Thus, the transaction accounts 22 or 30 can be used to make any payments, such as international payments 52, merchant payments, bill payments, cash payments with ATM withdrawals 46, and/or credit card payments 48, and functions as the center of any consumer payment transaction.

An "all account" aspect of an embodiment of the present invention provides an account referred to herein as the "all account", which offers customers of the person-to-person payments aspect of the system, such as customer 10 or recipient 14, the opportunity to receive a debit card with a 16 digit credit card number which draws funds from the customer's transaction account 22 or 30 so that the customer, such as customer 10 or 14, can shop. A plastic card is issued to every customer 10 or 14 who wants one, so that the card can be used in the physical world as well as the virtual one. Customer 10 or recipient 14 can self-fund their respective transaction accounts 22 or 30 by transferring money into transaction accounts 22 or 30, or customer 10 or recipient 14 can use money received through the person-to-person payment service. An extremely important feature of the "all account" for an embodiment of the present invention is an additional credit utility attached to the "all account" for credit-eligible customers.

The 16-digit number access card number is known to the customer 10 or recipient 14 but is not shown during authorization, unless the customer 10 or recipient 14 requests the number and successfully answers several electronic identification verifier questions. If the customer 10 or recipient 14 does not want an access card number, the customer 10 or recipient 14 must wait to receive a plastic card in the mail. Upon approval, if the customer 10 or recipient 14 is not given access to a debit card number, the customer 10 or recipient 14 has access only for person-to-person payment functions. Once the customer 10 or recipient 14 receives a debit card, the customer 10 or recipient 14 has full "payment to anyone" access. The access card is the only physical plastic to access monies from a customer's transaction account and/or line of credit. The debit card is used to access funds in the line of credit rather than checks.

The transaction account 22 or 30 has a 16-digit number that has no credit utility and is not shown to the customer 10 or recipient 14, and a separate bank identification number is established for the transaction account. In addition, an access card number with a 16-digit credit card number has an associated line of credit that uses the same account number, and a separate bank identification number is established for the line of credit. The transaction account 22 or 30 contains "save for later" money and, for a sender, "held money" that has not yet been taken by a recipient. The customer 10 or recipient 14 is shown the "save for later" and the "held money" portions of the transaction account 22 or 30. The transaction account 22 or 30 is tied to the access card number within the cards division of the service provider 20. The access card is able to access both the transaction account 22 or 30 and the line of credit. During a transaction, the "save for later" money is used first, and when used up, the line of credit is accessed.

The addition of credit functions to customers' transaction accounts in the system of an embodiment of the present invention enables the system provider 20 to receive 100% of the interchange on purchases as well as interest on revolving balances, thus heavily impacting profitability for the system provider 20. In addition, instead of requiring customers, such as customer 10 and/or recipient 14, to take an immediate action with the money in their transaction accounts 22 or 30, the "save for later" functionality is a cornerstone for the "all account" that allows customers to leave money in their transaction account 22 or 30, sometimes referred to herein as the "clip", with which customers can later fund any of the available transaction types, such as person-to-person payments or merchant payments. Further, a bill payment service adds functionality for customers to use their credit card accounts as source accounts to pay bills through the bill payment service.

In a self-funding feature of an embodiment of the present invention, if the recipient 14 of a $50 gift from the customer 10 via the person-to-person payment aspect wishes to make a purchase that exceeds the amount of the gift, the recipient 14 can take it a step further. For example, if the recipient 14 wishes to buy something from a web merchant or retail store for $100, the recipient 14 can self-fund the recipient transaction account 30 with an additional $50, so that he or she has $100 in the account 30 to spend. In other words, the merchant payments aspect expands the functionality from simply accepting and depositing value to the recipient's account 30, to allowing the recipient 30 to shop with the value that is deposited. The value appears, for example, as a payment on the recipient's credit card account 36. Thus, when the $50 gift received by the recipient 14 is moved to the recipient's credit card account 36, it shows up as a payment and applies, for example, to the recipient's minimum payment due. On the other hand, if the recipient 14 has a zero balance, the $50 gift shows up as a credit balance on the recipient's credit card account 36, so the recipient 14 has money in the account 36 that is available to spend.

Another aspect of an embodiment of the present invention is a "person-to-anyone" payments aspect, which provides other payment options for the customer 10 or recipient 14, in addition to person-to-person payments, such as the ability to pay merchants for purchases. In extending the basic functionality of the system of the present invention, the focus of the payment to anyone aspect shifts from a money transfer service to a money deposit account that the customer 10 or recipient 14 can use as a source and a destination of funds. In this aspect, the user interface refers to the transaction account 22 or 30 as a "clip", and customers are directed to focus on the "clip" 22 or 30 as the center of their on-line financial life. The merchant payments aspect for an embodiment of the present invention addresses a currently unmet customer need to be able to utilize money received in the person-to-person transaction account 22 or 30, for example, to shop.

In addition, the merchant payments aspect for an embodiment of the present invention leverages the strength of the existing credit card business of the service providing financial institution 20. The concept of the "clip" 22 or 30 is a key feature of the system for an embodiment of the present invention. The "clip" 22 or 30 is perceived by a customer, such as customer 10 or recipient 14, as an omnipresent mechanism for managing and using the customer's money both online and off-line. The "clip" becomes the customer's repository for incoming and outgoing funds, enabling a "person-to-anyone" payments system architecture. In an embodiment of the present invention, a "clip" frame is displayed on every page of the user interface (UI). Further, a "Your Balance" frame of the UI contains "Total Available", "Cash Available", "Line of Credit", "Add Money", and "Logoff". In making the "clip" the central point of the customer's financial life on-line, an embodiment of the present invention provides usability improvements to the HTML interface layer.

Figure 6:
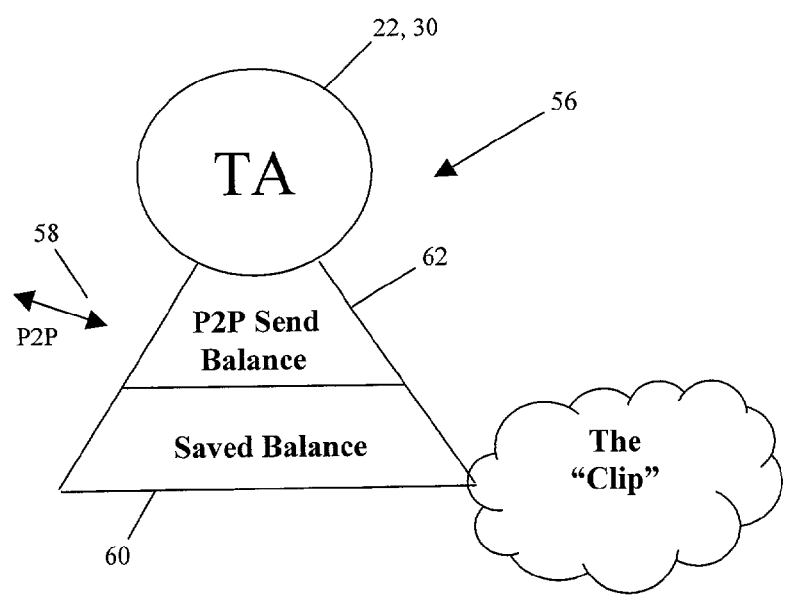
FIG. 6 is a schematic diagram that illustrates an example of properties of the "all account" at the basic or silver level of service for an embodiment of the present invention.

In order to accommodate needs of different customers, the system for an embodiment of the present invention provides varying service levels. Matching the right product to the customer 10 or 14 is done with a combination of customer choice and credit scoring initiated by the system. The levels of service for the "all account" include, for example a basic or "silver" service, a premium or "gold" service, and an ultimate or "platinum" service. FIG. 6 is a schematic diagram that illustrates an example of properties of the "all account" at the basic or silver level of service for an embodiment of the present invention. The basic or silver service 56 provides a full person-to-person payment service 58 with the addition of "save for later" functionality 60. All person-to-person payment customers qualify for the silver level of service 56. The customer 10 or 14 is able to receive and send money from the customer's transaction account 22 or 30. The transaction account 22 or 30 is classified as a deposit account and contains a "save for later" portion 60 and a "held money" portion 62, which represents money that the customer 10 or 14 has sent to a recipient, which has not yet been picked up by the recipient. The customer 10 or 14 does not receive an access card (plastic) or a line of credit for the basic or silver service 56, but the customer 10 or 14 can upgrade from the silver level of service 56 to a higher level of service.

Figure 7:
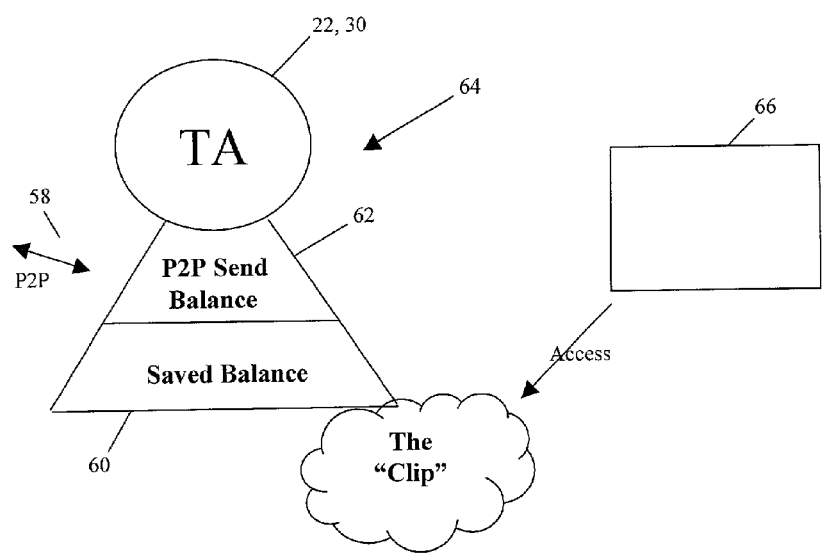
FIG. 7 is a schematic diagram that illustrates an example of properties of the "all account" at the premium or gold level of service for an embodiment of the present invention.

FIG. 7 is a schematic diagram that illustrates an example of properties of the "all account" at the premium or gold level of service 64 for an embodiment of the present invention. The premium or gold service 64 provides full person-to-person payment service 58, with debit card functionality and a plastic card 66. Customers who either decline a credit line or are not eligible for a credit line qualify for the gold level of service 64 and receive a plastic card 66 for use in the off-line world. The gold level of service 64 includes the silver level of service 56, and the transaction account 22 or 30 is the same as the silver level of service 56, but with no credit line. An access card (plastic) 66 is issued to access the "clip" or transaction account 22 or 30, and there is one access card 66 for each transaction account 22 or 30. Each transaction account 22 or 30 is tied to an email. Each customer 10 or 14 is allowed up to three transaction accounts.

Figure 8:
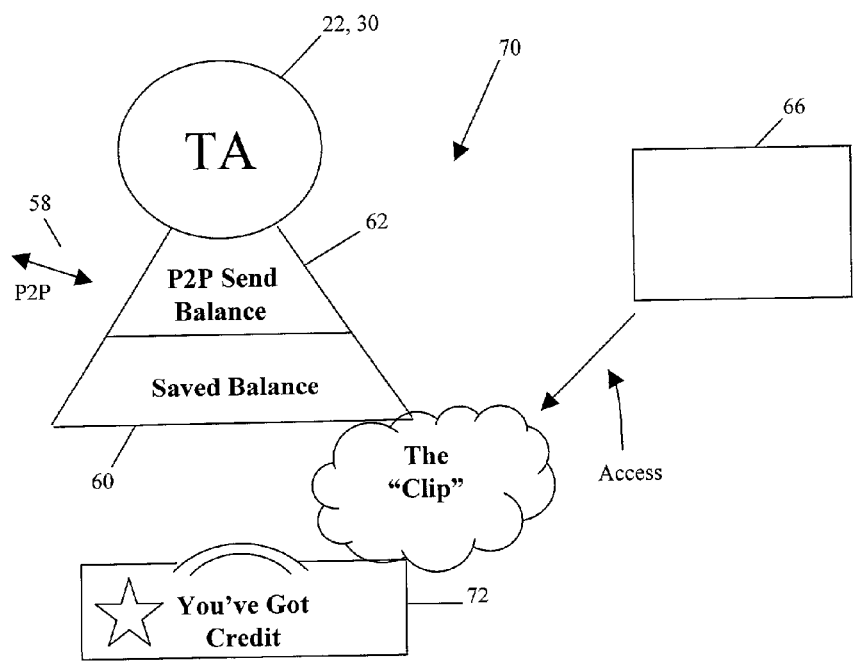
FIG. 8 is a schematic diagram that illustrates an example of properties of the "all account" at the ultimate or platinum level of service for an embodiment of the present invention.

FIG. 8 is a schematic diagram that illustrates an example of properties of the "all account" at the ultimate or platinum level of service 70 for an embodiment of the present invention. The ultimate or platinum service 70 provides full person-to-person payment service 58 with full debit card functionality, and with the addition of a credit line 72. The platinum level of service 70 includes the silver 56 and gold 64 levels of service, except that the "clip" or transaction account 22 includes the customer's saved balance 60 plus the amount of the customer's line of credit 72. The access card (plastic) 66 is issued to the customer 10 or 14 to access both the line of credit 72 and/or the saved balance funds 60.

In an embodiment of the present invention, a "level indicator" is created and appended to the customer's enrollment file and used at future logins to drive the UI. All customers have a persistent window/toolbar which appears on all screens. All customers are able to view their available credit line 72, available cash 60 and their total available credit line 72 and cash 60. The customer's level of service determines what is displayed for the customer's line of credit 72. Customers at the platinum level 70 have an amount displayed for their line of credit 72, but for customers at the gold 64 and silver 56 levels, the line of credit has "$0" displayed for a line of credit. Customers are able to add money to their "clip" or transaction account 22 using a button on the window/toolbar. Shopping, form fill and password memory functionality is also provided to aid customers in shopping.

Through the enrollment process for an embodiment of the present invention, the customer 10 or 14 may or may not qualify for a debit card 66 and/or a line of credit 72, which can be characterized as an overdraft protection. The customer 10 or 14 is evaluated when the customer enrolls, and there may be one or more reasons why the customer may not qualify for a credit or debit card 66. The minimum that the customer 10 or 14 receives, however, is the transaction account 22 or 30, which can be characterized as a deposit account and is as simple as going to a bank and opening up a savings account. The enrollment process is a significant aspect of the system of the present invention, because it involves conditionally approving customers, based upon an approval process. The approval process becomes a very significant aspect because it requires performing an evaluation that is sufficient to determine what level of service to offer the customer 10 or 14. The levels of service include, for example, the basic level 56 that is the deposit or transaction account 22 or 30, the premium level 64 that is the deposit or transaction account 22 or 30 plus the debit card 66 to access the customer's money, and the ultimate level 70 that is the deposit or transaction account 22 or 30 with the debit card 66, plus an overdraft credit line of protection 72.

In the system and method for an embodiment of the present invention, other services offered to customers, such as customer 10 and recipient 14, include, for example, a bill payment service, as well as additional financial payment services. The bill payment aspect enables the customer 10 to facilitate the payment of bills and the presentment of the customer's bills via the Internet 18. Thus, the system of the present invention provides a single place for users, such as customer 10 and recipient 14, to go to transact all of their payments, such as merchant payments or person-to-person payments, using all available payment mechanisms, such as a paper check through the ACH system or a credit card to the merchant's system. The system for an embodiment of the present invention also includes, without limitation, any other bilateral payment process or private payment activity between individuals.

The bill payment aspect for an embodiment of the present invention integrates bill payments into the service and provides an option, for example, to the recipient 14 of the $50 gift to use the gift to pay the recipient's bills. Thus, the recipient 14 can take the $50 gift and send it to the telephone company or electric company or to the recipient's gardener to pay the recipient's bills, using a bill payment service. The bill payments aspect utilizes a bill payment service either to make the payment directly or to cut a check, depending upon the payee of the bill payment. The system of the present invention does not necessarily make payments directly to a biller, for example, but uses and integrates a bill payment product of the service provider 20.

The system for an embodiment of the present provides major advantages over existing bill payment service. In existing bill payment services, a user signs up his or her checking account as the funding source to pay bills, and each month, the user proactively pays his or her bills electronically. For example, the user goes on-line via the Internet and picks the bills and the amounts that the user wants to pay, and on the same day, the user's checking account is debited for the amounts indicated. Thereafter, if the payee, such as the telephone company, has a capability to receive an electronic payment, the payee receives an electronic funds transfer made from the user's checking account by the bill payment provider directly to the payee. If the payee, such as the user's gardener, has no such capability, the payee is sent a check that is cut for the particular bill payment, and the gardener receives the check in the mail. The system for embodiment of the present invention replaces the user's checking account with the transaction account 22 or 30 as the funding source for those bill payments. The transaction account 22 or 30 is subject to the same federal and state regulations for banking as any other deposit account, such as a savings account or checking account.

In an international payments aspect of an embodiment of the present invention, a customer, such as customer 10 or recipient 14, can utilize the system to send, for example, a wire or check payment abroad to foreign countries. In addition, customers who are residents outside the United States, such as a customer residing in London, can log on the web site for the system and enroll in the service for an embodiment of the present invention. The customer can then use the system, for example, to make person-to-person email payments to other United Kingdom residents or to other recipients in different countries.

Figure 9:
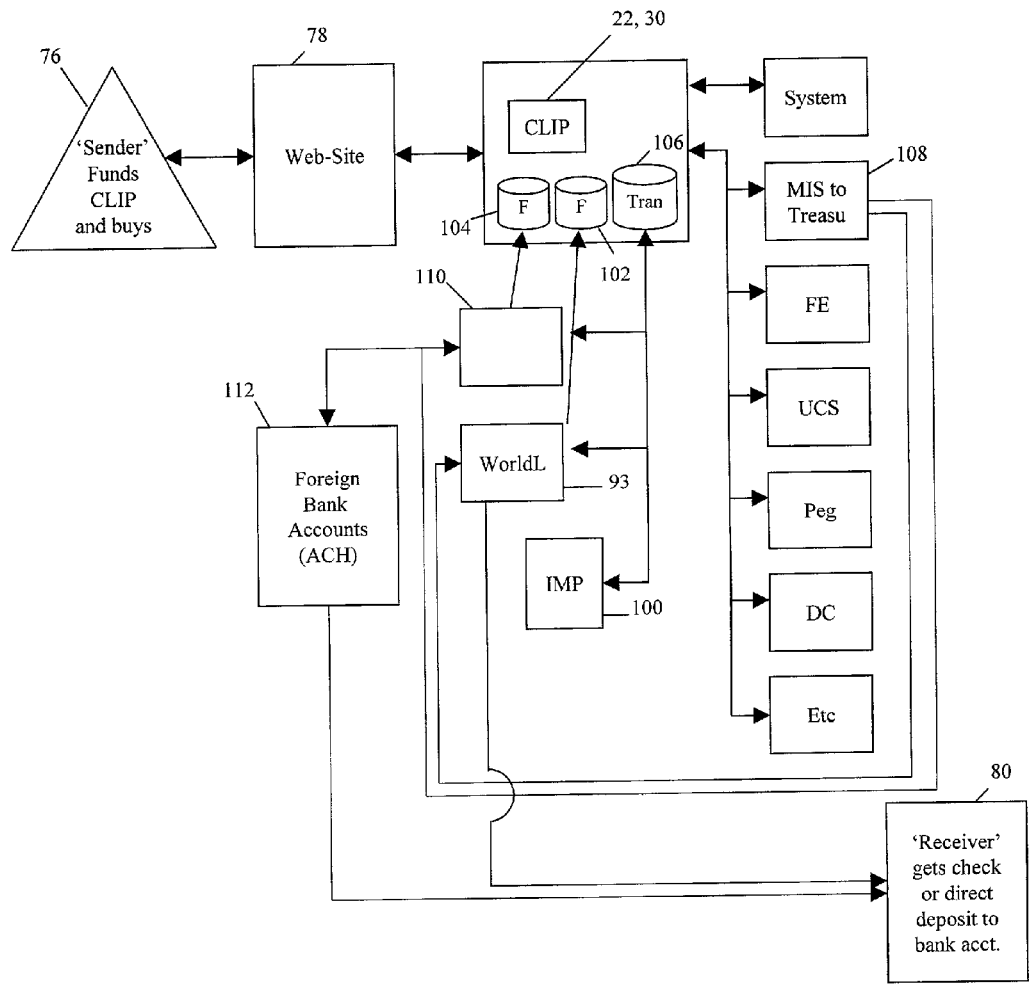
FIG. 9 is a schematic diagram which illustrates an example overview of key components and the flow of information between the key components of the international payments aspect of an embodiment of the present invention.
Figure 13:
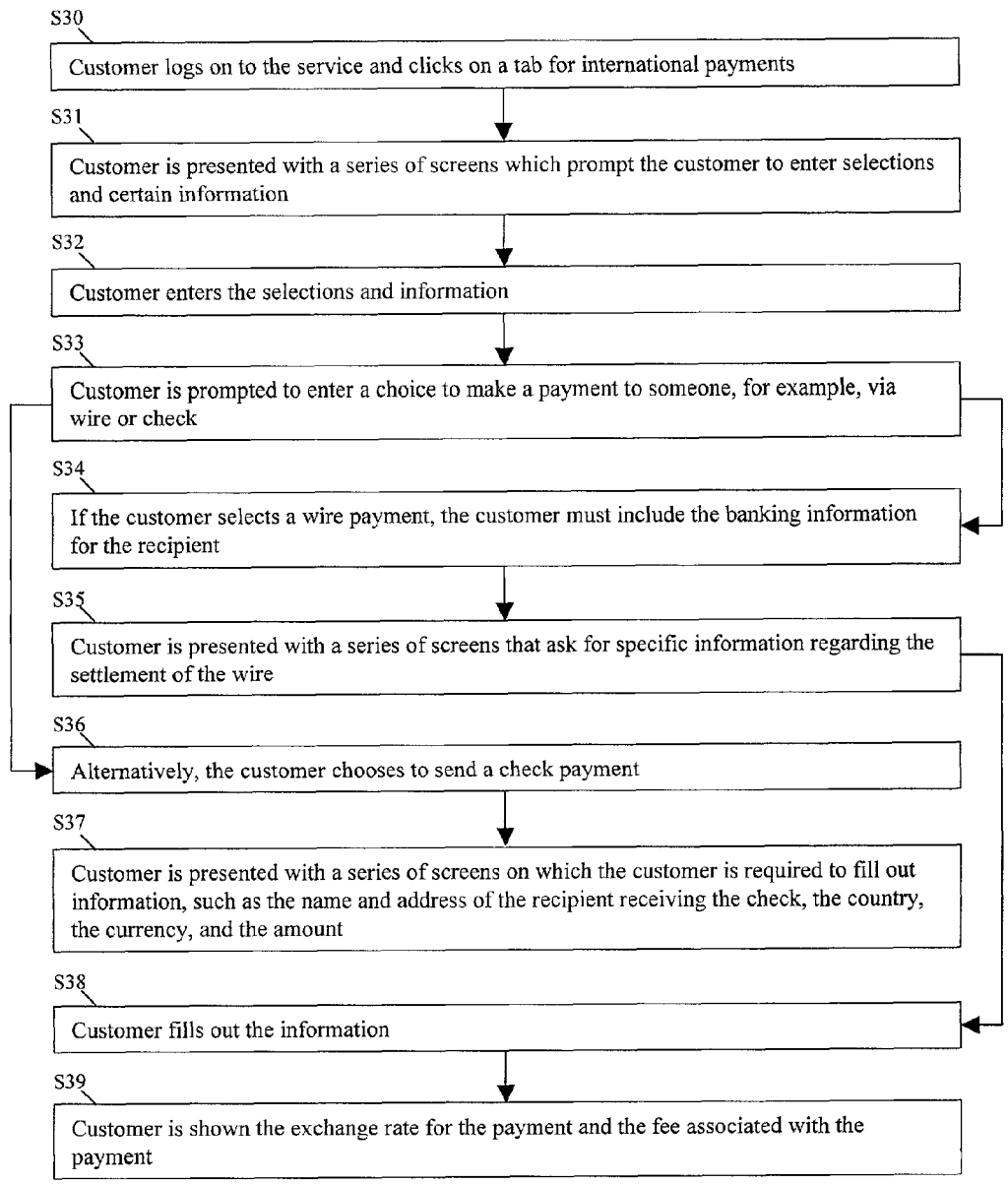
FIG. 13 is a flow chart which illustrates an example of the process of initiating an international payment on the system for an embodiment of the present invention.

FIG. 9 is a schematic diagram which illustrates an example overview of key components and the flow of information between the key components of the international payments aspect of an embodiment of the present invention. FIG. 10 shows a sample user interface screen for an international check payment aspect; FIG. 11 shows a sample user interface screen for an international wire payment aspect; and FIG. 12 shows a sample user interface screen for an international ACH payment aspect of an embodiment of the present invention. FIG. 13 is a flow chart which illustrates an example of the process of initiating an international payment on the system for an embodiment of the present invention.

Referring to FIGS. 9-13, at S30, a sender 76, such as customer 10 or recipient 14, logs on the service for an embodiment of the present invention, and clicks on a tab for international payments. At S31, the sender 76 is presented with a series of screens which prompt the sender 76 to enter selections and certain information. At S32, the sender 76 enters the selections and information and, at S33, the sender 78 is prompted to enter a choice to make a payment to someone, for example, via wire or check. At S34, if the sender 76 selects a wire payment, the sender 76 must include the banking information for the recipient 80, and at S35, the sender 76 is presented with a series of screens, such as international wire details screen 82, that ask for specific information regarding the settlement of the wire. Alternatively, at S36, if the sender 76 chooses to send a check payment, at S37, the sender 76 is presented with a series of screens, such as international check details screen 84 on which the sender 76 is required to fill out information, such as the name 86 and address 88 of the recipient 80 receiving the check, the country 90, the currency 92, and the amount 94. At S38, the sender 76 fills out the information, and at S39, the sender 76 is shown the exchange rate for the payment and the fee associated with the payment.

The international payments aspect for an embodiment of the present invention provides a global payment platform that enables customers, such as customer 10 or recipient 14, to pay anyone, anywhere, anytime. A feature of the international payments aspect of the system of the present invention provides domestic customers with the ability to purchase a multinational payment via check, international Automated Clearing House (iACH), or wire from the customers' U.S. dollar system transaction accounts. Another feature of the international payments aspect of the system involves expansion outside the U.S. and the addition of other countries to the system network. As each new country is added, there is full transfer functionality between accounts, and customers are able to move monies between currencies and cross-border in real time.

The international payments aspect for an embodiment of the present invention provides a capability for customers to send checks, iACHs, and wires in foreign currency through the use of third party vendors and services developed by the system provider 20 for large corporate customers that need to execute high volume, low value payments and collections in multiple countries. Such system provider developed services include a service that allows corporations to make payments via check in many different foreign currencies, referred to herein as WorldLink 98. The account 22 or 30 of the sender 76 is debited in its base currency and a check issued from an omnibus account 112 in the designated currency. The checks are sent to the recipient 80 via mail from processing centers, for example, in Europe and the U.S. WorldLink 98 also provides wire transfer capability in many countries.

Another such system provider developed service is a service that provides a single interface to numerous domestic low value clearing or Automated Clearing Houses (ACH/GIROs) globally, referred to herein as International Mass Payment Service/International Direct Debits (IMPS/IDD) 100. IMPS/IDD 100 allows corporate customers to transmit instructions for payments or debits to recipients in multiple countries. Via a single interface, customers can transmit a high volume of transactions, in a single electronic file, in a single format, via a single means of connectivity and security.

The international payments aspect of the present invention provides functionality, such as international checks, IACH payments, and wire transfers. With regard to international checks, system users are able to purchase multi-currency checks in any of a number of available foreign currencies, initiated in the U.S. from the system web site 78. Check orders are accumulated in a transaction journal log 106 throughout the day. Once per day, data in the transaction journal log 106 is batched and transmitted to a WorldLink 98 data center in the U.S. WorldLink 98 conducts edits on the file, kicks out rejects, and routes the remaining 'good' orders to a check printing facility, for example, in London. Checks are printed on check stock with local bank sort codes and account numbers so that the checks are treated as local collection items by the depositing institution. Checks are mailed, for example, from London to the destination country. Exception items, such as rejects/returns, are notified to the system each day via facsimile. A PC-based customer service system is available to the system to request check stop payments and check photocopies.

With respect to iACH payments, system users, such as sender 76, are able to purchase a payment into a foreign bank account in any of a number of foreign countries via the local ACH system, initiated in the U.S. from the system web site 78. IACH orders are accumulated in the transaction journal log 106 throughout the day. Once per day, data in the transaction journal log 106 is batched and transmitted to IMPS 100 via a global file handler (GFH). The GFH scans the file for format errors and either accepts or rejects the entire file. If accepted, the file routes to IMPS 100, and IMPS 100 sends instructions to a local system account 112 in the appropriate foreign country. Payments are made into the local clearing systems in each country, funded from the system's local account 112 in each country. Rejects and return credits are refunded to the system's local accounts 112, and notification is sent to the system via facsimile each day for reconcilement purposes. Phone customer service is available for to system users for iACH dispute/repudiation exceptions.

For wire transfers, system users, such as sender 76, are able to purchase a wire transfer, for example, via Society for Worldwide Interbank Financial Telecommunication (SWIFT) into a foreign bank account in any one of numerous foreign countries. Wire transfer orders are accumulated throughout the day in the transaction journal log 106. Once per day, the transaction journal log 106 is batched and transmitted to WorldLink 98 in the same process and destination as for international checks. Check and wire transfer orders are in the same file, and WorldLink 98 splits out the orders. Wires and ACH payments are directly deposited into the account of the recipient 80. Checks are sent in the mail to the recipient 80 for deposit into the bank account of the recipient.

Payment for purchases of the foreign currency can be made from the system clip or transaction account 22, 30 and all other credit card accounts. Silver 56, gold 64, and platinum 70 level customers are eligible for system international purchases. Silver 56, gold 64, and platinum 70 level customers can access and use the value in their clip or transaction account 22, 30 or any credit card to buy a check, iACH, or wire. As used in the discussion of the international payment aspect herein, the term "send" means loading value into a system account 22 or 30, and the term "purchase" means the purchase of an international payment from a system account 22 or 30. As also used in the discussion of the international payment aspect herein, the term "sender" 76 means an enrolled silver 56, gold 64, or platinum 70 level system customer who initiates an international transaction, and the term recipient 80 means a beneficiary of an international transaction who is not a system customer.

An interface to WorldLink's and IMPS' data center provides, for example, foreign exchange (FX) rates fixed daily. Rates are set for the system based on desired spreads, which are built into a daily rate table 102 provided by WorldLink 98 for checks and wires. A financial institution F/X system 110 provides a daily FX rate table 104 for iACH payments. There are two separate FX rate tables 102, 104 transmitted to the system each day, each with potentially different rates for each currency. The two rate tables 102, 104 are used because IMPS 100 does not provide FX and cash management service for iACH payments. Check, wire issuance, and/or iACH payments are captured in the transaction journal log 106, batched and transmitted to WorldLink 98 and IMPS 100 each day. The interface also provides MIS 108 to the system on all transactions, so that the system treasury can perform FX purchases and account management functions. Confirmation files are sent from WorldLink 98 each day as well as a file of check status, such as paid/outstanding. This file is loaded into the system and the system user's status is updated on the system user's transaction history 106. In addition, the interface provides reconcilement tools/exception handling via the WorldLink PC-based system. Further, the interface provides debit and credit to the system omnibus account for WorldLink 98 and debits and credits to system local currency accounts for IMPS 100.

Because, unlike WorldLink 98, IMPS 100 does not provide FX and cash management services, the system for an embodiment of the present invention establishes a bank account 112 in each foreign country and arranges for foreign currency to be in each account 112 in order to fund the iACH payments each day. The financial institution's F/X system 110 provides both the foreign exchange and the daily funding of the system accounts 112. The IMPS/IDD platform sorts, reformats, validates and distributes the individual transactions to the appropriate ACH/GIROs or other payment platform in time to meet the required value dates. Credits/debits are processed in a timely manner, which is a benefit to the issuing customer. IMPS/IDD 100 provides access to a comprehensive array of payment and collection methods, for example, in North America, Europe, Latin America, and Asia, as well as Central and Eastern Europe, Middle East, Africa and South Asia (CEEMEA), that include payments/collections in foreign countries, such as ACH/GIRO payments, ACH collections, and remote cheques via WorldLink 98.

The system for an embodiment of the present invention links to a financial institution FX system trading desk 110 and the FX desk for WorldLink 98 and receives FX rate tables 102, 104 with rates guaranteed for 24 hours. This enables the system for the present invention to provide users with guaranteed FX rates when they purchase international transactions. Each day, at a designated time, which occurs at the same time the prior day's batch transaction journal log is cut, the FX tables 102, 104 are transferred to and loaded into the system. These new rates are used for the next 24 hours.

For iACH FX processed via the financial institution's FX system 110, when the daily transaction journal log 106 is batched, a file that summarizes the total amount of each currency is sent to the financial institution's FX system 110. This file is loaded into the financial institution FX system's chief dealer system. The treasury of the system of the present invention uses the financial institution FX system's confirmations on the Web system to view and approve the daily FX order. Once the treasury approves the order, the financial institution FX system 110 purchases the FX and wires the money for two-day settlement to the local accounts 112 for the system of the present invention in each of the countries where iACH payments are available via IMPS 100. IMPS 100 holds each day's order for 2 days before executing payments out of the local accounts 112 of the system to ensure that the accounts 112 are adequately funded by the financial institution's FX system 110. When iACH rejects/returns occur, credits are routed into the local accounts 112 of the system, and IMPS 100 provides details to the system's treasury via fax. The system treasury uses the chief dealer system to execute small FX trades, such as selling and buying U.S.

dollars needed to ensure that the sender 76 is credited for rejects/returns at the current FX rate.

For check and wire transfer purchases processed via FX of WorldLink 98, a main difference between the FX system of the financial institution 110 and the FX system of WorldLink 98 is that the system treasury faxes the daily FX order to the FX desk of WorldLink 98. WorldLink 98 then purchases the FX and uses its own accounts around the world to fund the checks and wires. Credits for exceptions are routed back to the system's omnibus account in the U.S. The system treasury ensures that the sender 76 is credited for rejects/returns/stop payments at the current FX rate.

While a majority of countries have similar requirements for processing wire transfers and iACH payments, some variations exist. The file formats provided by IMPS 100 and WorldLink 98 comprise all possible variations. However, users of the present system, such as sender 76, are prompted on the system web site 78 to input certain required data depending on the country selected by the system user. For example, certain countries may require the beneficiary's phone number in the payment instructions while other countries do not require this information. Additionally, the system of the present invention may impose its own country variations for risk management and business purposes. For example, different per transaction limits may be specified depending on the country selected.

In the international payments aspect, the system for an embodiment of the present invention, for example, accepts international payment orders from the web site 78, creates a daily file of transaction detail orders, and transmits the orders to IMPS 100 and WorldLink 98. The system creates a daily file of FX currency totals to send to the FX system of the financial institution 110, accepts files from WorldLink 98, IMPS 100 and the FX system of the financial institution 110, such as FX rate tables 102, 104, transaction status, confirmation files, and a paid and stopped check file, and debits and credits the sender's clip or transaction account 22 for all transactions and fees.

In addition, the system for an embodiment of the present invention, for example, ensures that all transaction data is maintained, generates various reports for settlement, including a new transactions report that details each new transaction initiated through the payment processor and a new transactions summary that is a summary of the information in the new transactions report, tracks senders' transactions and dollar amounts against their limits and country specific limits, halts a sender's ability to transact if the sender exceed limits, and accepts adjustments from customer service/operational areas to the sender's clip or transaction account 22 and transaction history log 106.

Further, the system for an embodiment of the present invention, for example, loads new FX rate files received from WorldLink 98 and the financial institution's FX system 110, with the countries supported, into a table each weekday and calculates a percentage mark-up (variable) based upon the FX rate for each country, stores all information until a transaction is completed or abandoned so the sender 76 does not have to re-enter all information, and determines the correct FX rate table to use (WorldLink 98 or the financial institution's FX system 110) for iACHs, checks, and wires.

In the international payments aspect for an embodiment of the present invention, for example, the system web site 78 captures information about a send transaction, such as a transaction number, country, local currency code, product type, such as check, wire, or ACH, exchange rate, amount in foreign currency, fees, total amount due, payment options, and recipient name, address, telephone, routing number, account number, bank name and address. The system validates, for example, maximum amount limits against transaction dollar amounts according to a fraud policy, a recipient name and address against specially designated nationals (SDN) lists, and if there are sufficient funds on the trading account 22 of the sender 76. Edit and cancel options are available to the sender 76 before a transaction confirmation is processed. The sender 76 is able to view on-line, details of the sent transaction including, for example, a transaction reference number, a transaction amount, fees, recipient data, and status of a check or wire. The system performs the function to send International payments via middleware and displays and assesses fees for transactions. Dynamic terms and conditions are defined for each of the levels of service.

An aggregator aspect of an embodiment of the present invention enables the a customer, such as customer 10 or recipient 14, to view all of the customer's financial information in one space using aggregating technology. Thus, the customer 10 or 14 is able to see the balances and transactions from all of the customer's on-line financial services providers and to see the customer's entire financial picture in one space. Once the customer 10 or 14 enrolls, the customer is offered an opportunity to participate in other services that are available to members, such as the aggregation process. The customer 10 or 14 engages in that service by completing several items of information to collect the data that is required for the aggregation process.

The aggregator process is a balance aggregator. Thus, assume that the customer 10 or 14 has a checking account with a particular bank, a loan with another bank, a money market account with a brokerage firm, and various certificates of deposit with one or more savings banks that all have on-line services. The aggregator process goes out to all of those on-line banks and the brokerage firm and collects the customer's account information and displays that information for the customer 10 or 14 on one screen in one consolidated way. The aggregator process performs screen scraping and is available at the customer's election. The aggregator process does not involve payments but facilitates the customer's payments, because it enables the customer 10 or 14 to know what the customer has in the various accounts.

In a user interface aspect for an embodiment of the present invention, for example, labels are hyperlinked with pop up windows that explain the field with additional context help as appropriate. Javascript is used for real time validation of all required fields. Information collected from the customer 10 or 14 is displayed on edit/confirm pages. The customer 10 or 14 is allowed to edit the information necessary, and data entry is simplified. Error messages are generated by an Internet layer, based on requirements of fields and tables. These messages are specific and user-friendly. User information for each session is cached on the Internet level to facilitate additional flexibility in both display and capture of information, as well as greater speed.

Other features of the user interface for an embodiment of the present invention include, for example, field validation, user interface modules, page sizing, and error handling. The user interface provides immediate field validation of user entries for reasonability level validation, so as not to be redundant with back-end validation. An advanced example of this is automatically correcting currency input. The UI is defined as a grouping of functionality, termed a UI module. Each module is intended to represent a complete function, such as "enrollment", "get cash" and "delete account".

Each module collects user-entered information from one or more web pages and then composes the appropriate middleware call at the end of the process. The user's page automatically sizes correctly regardless of the user's browser and setting of the resolution. If the response from a middleware call is an error, the UI displays the field in error and appropriate error message text within an independent web page and accepts a corrected entry from the user. The middleware call is resubmitted with the corrected entries. The flow continues as if no error had occurred.

Figure 14:
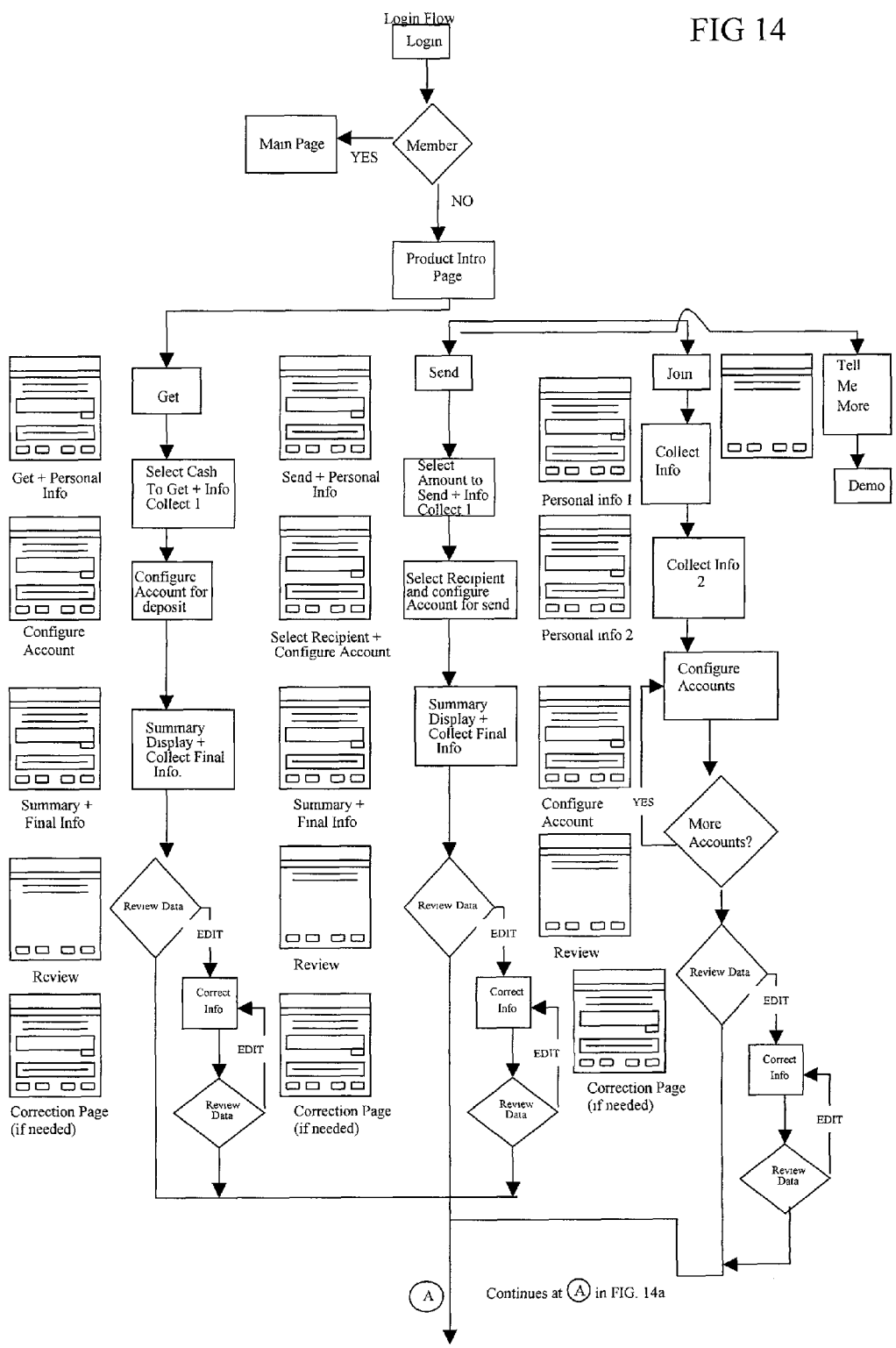
FIGS. 14 and 14a is a schematic flow chart which illustrates an example of the enrollment module for an embodiment of the present invention.
Figure 14A:
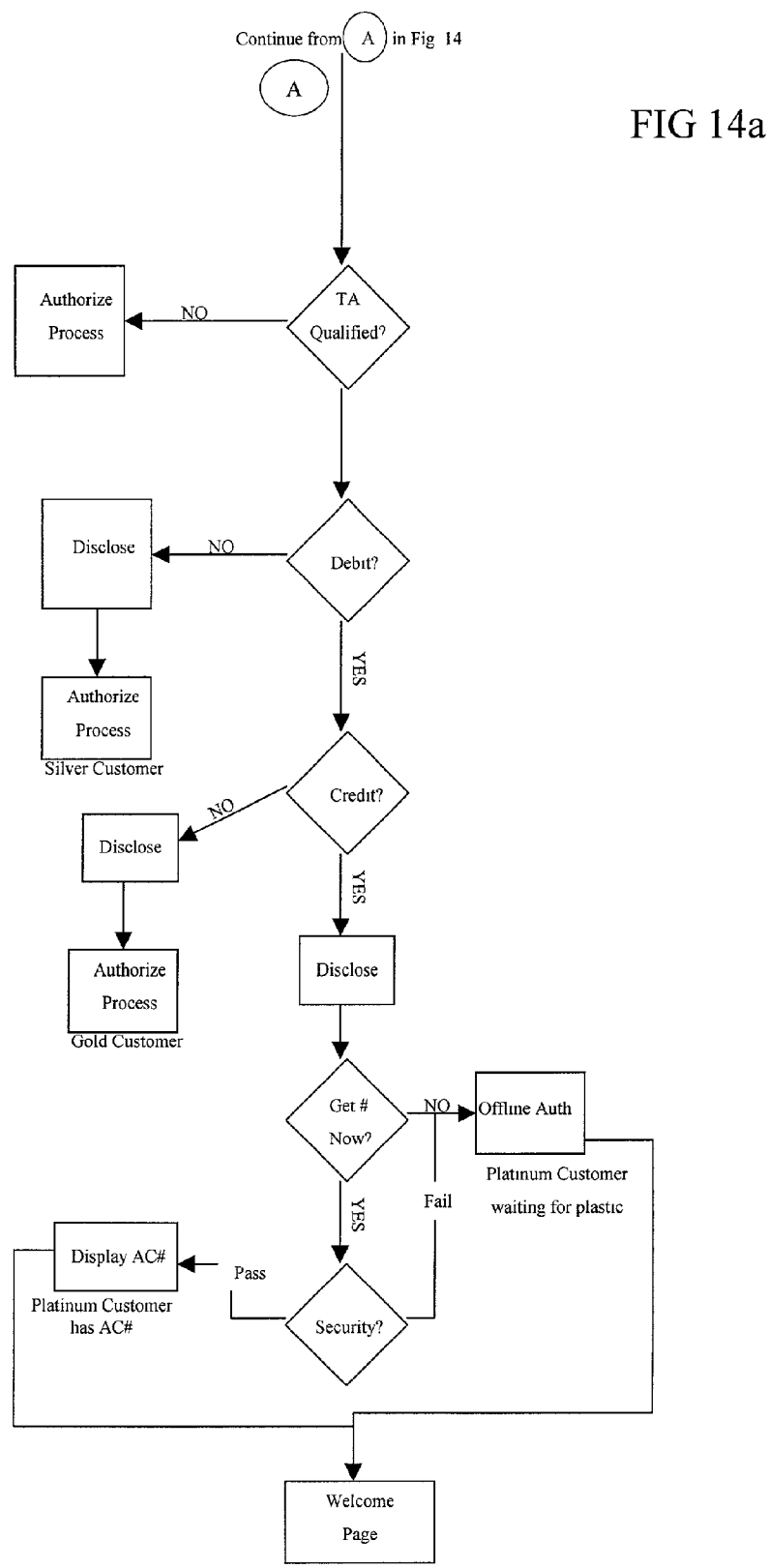
Figure 15:
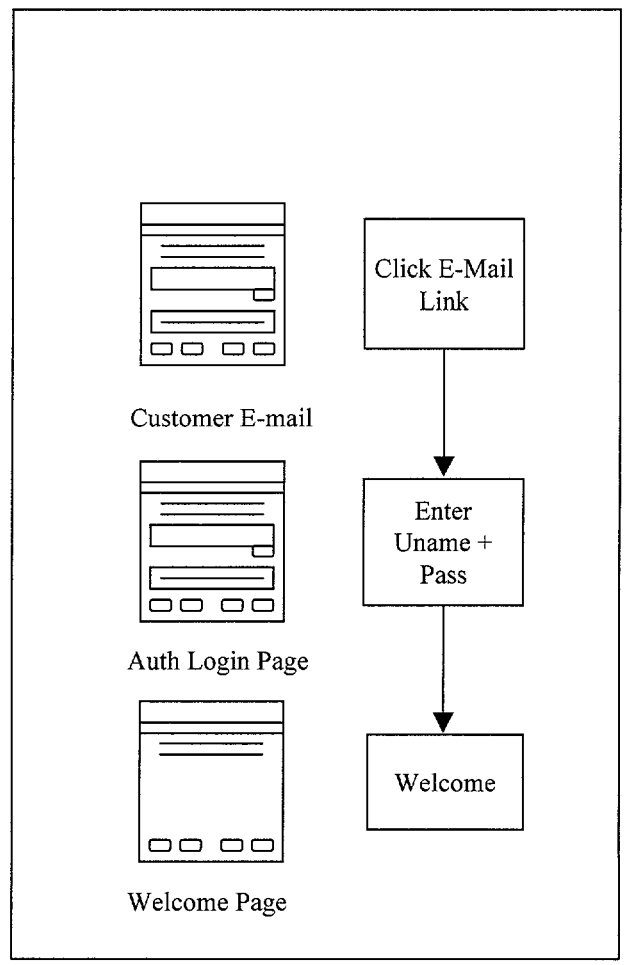
FIG. 15 is a schematic flow chart which illustrates an example of the log in process for an embodiment of the present invention.
Figure 16:
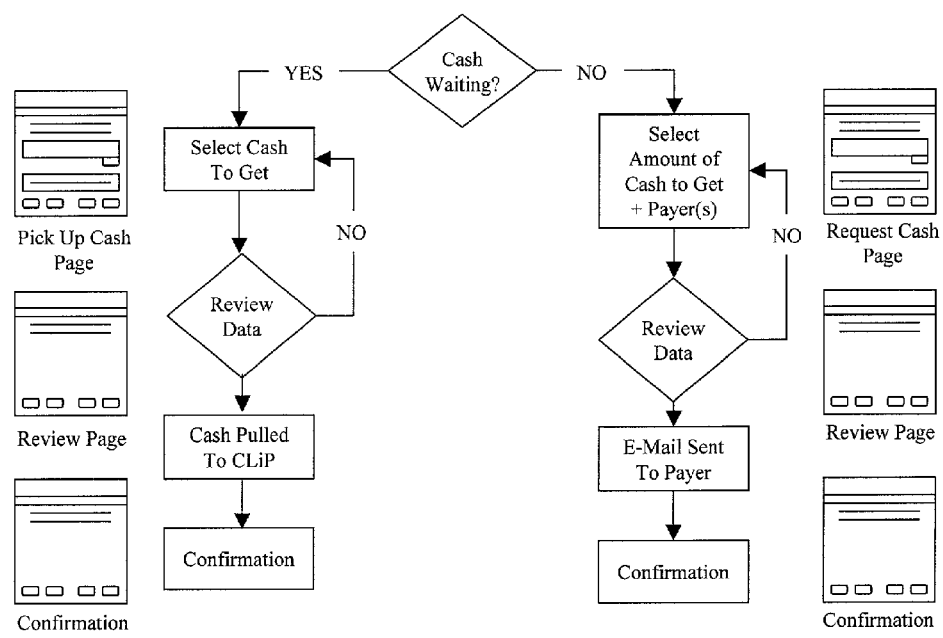
FIG. 16 is a schematic flow chart which illustrates an example of the pick up/request cash module for an embodiment of the present invention.
Figure 17:
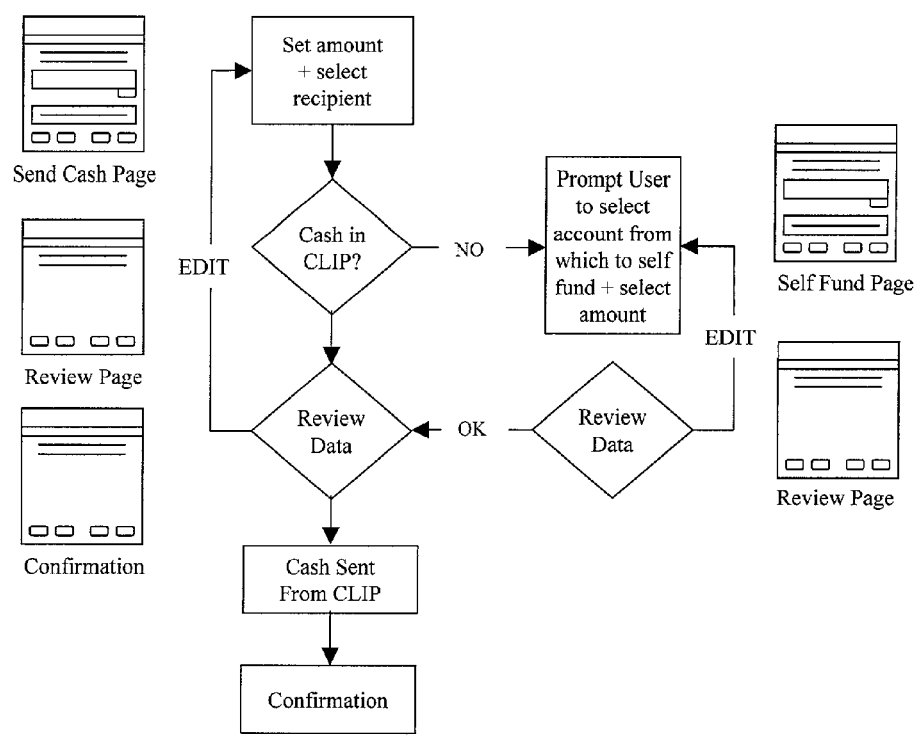
FIG. 17 is a schematic flow chart which illustrates an example of the send cash module for an embodiment of the present invention.

FIGS. 14-25 are flow charts which illustrate examples of modules for the processes of enrollment, authorize member, pick up/request cash, send cash, transfer, self fund, cancel transaction, add account, edit account, delete account, history/statement, and profile update for an embodiment of the present invention. The function of the enrollment module shown in FIGS. 14 and 14a is to enroll the customer 10 in the service as unobtrusively as possible and requiring only the minimum information necessary. FIG. 15 is a schematic flow chart which illustrates an example of the log in process for an embodiment of the present invention. The function of the pick up/request cash module of FIG. 16 is to permit the customer 10 or 14 to obtain cash and accommodates both a single pick up and a multiple pick up. The function of the send cash module in FIG. 17 is to provide options and information necessary to send cash and accommodates a single send cash. The function of the transfer and self fund module illustrated in FIGS. 18 and 19 is to transfer funds from one account to another account, such as to and from the transaction account 22 or 30 with a "self-funding" look and feel and to pay the credit line 72.

Figure 20:
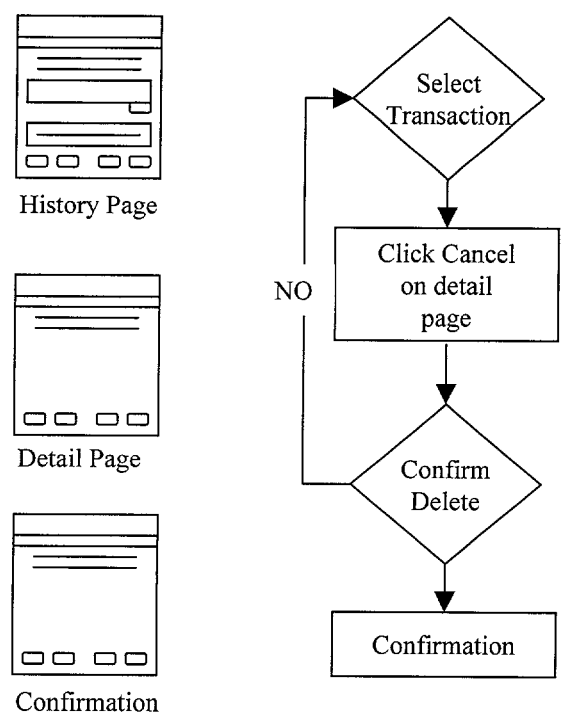
FIG. 20 is a schematic flow chart which illustrates an example of the cancel transaction module for an embodiment of the present invention.
Figure 21:
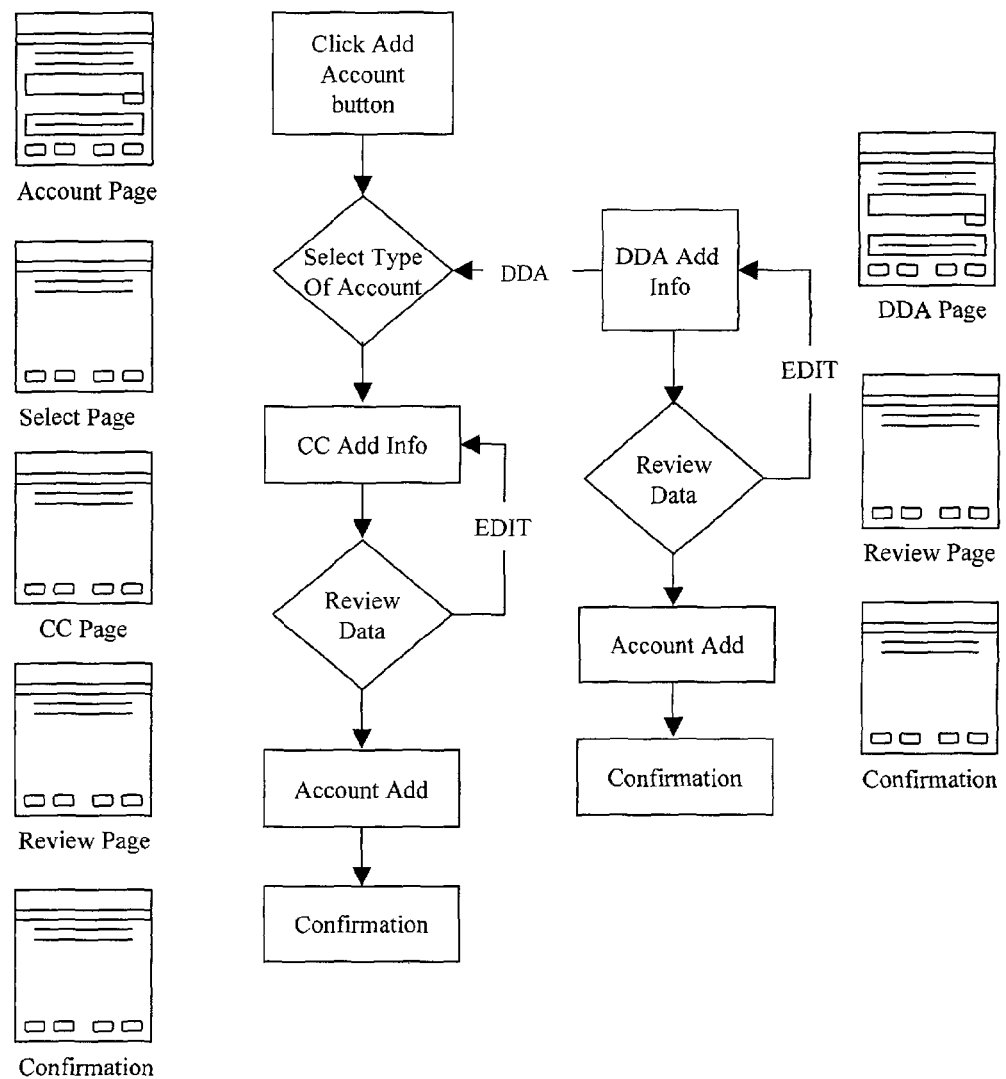
FIG. 21 is a schematic flow chart which illustrates an example of the add account module for an embodiment of the present invention.
Figure 22:
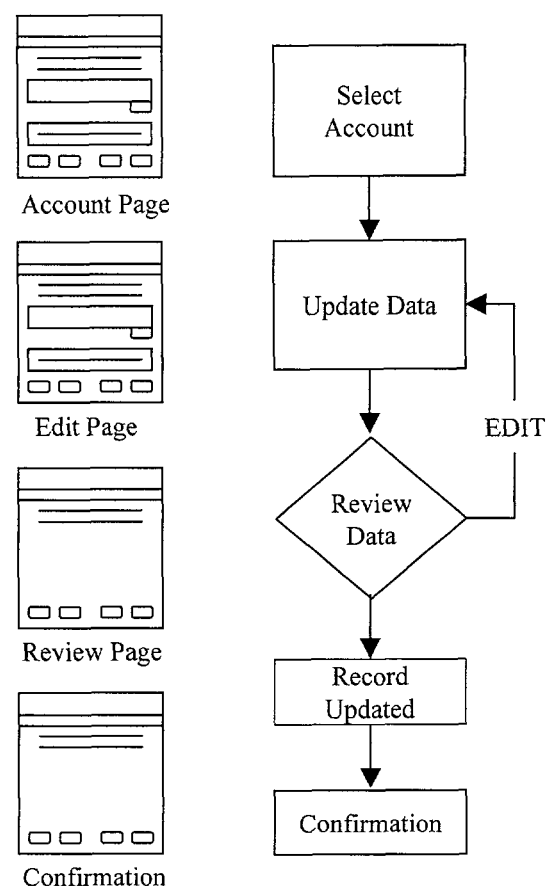
FIG. 22 is a schematic flow chart which illustrates an example of the edit account module for an embodiment of the present invention.
Figure 23:
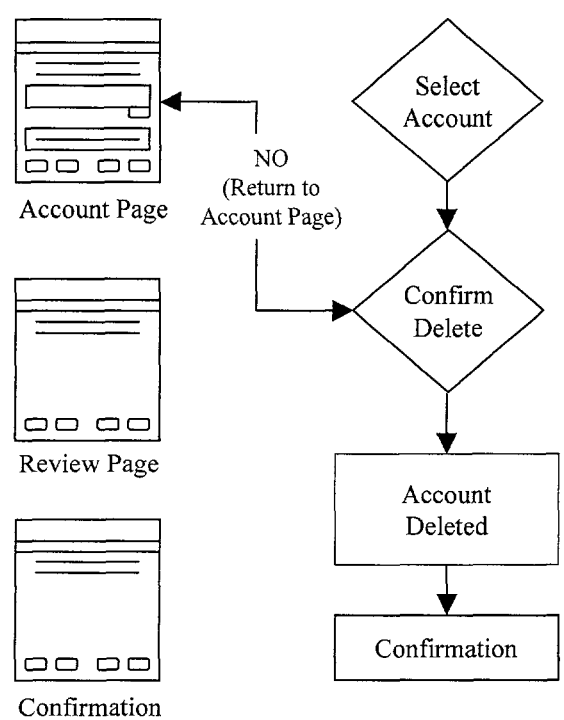
FIG. 23 is a schematic flow chart which illustrates an example of the delete account module for an embodiment of the present invention.
Figure 24:
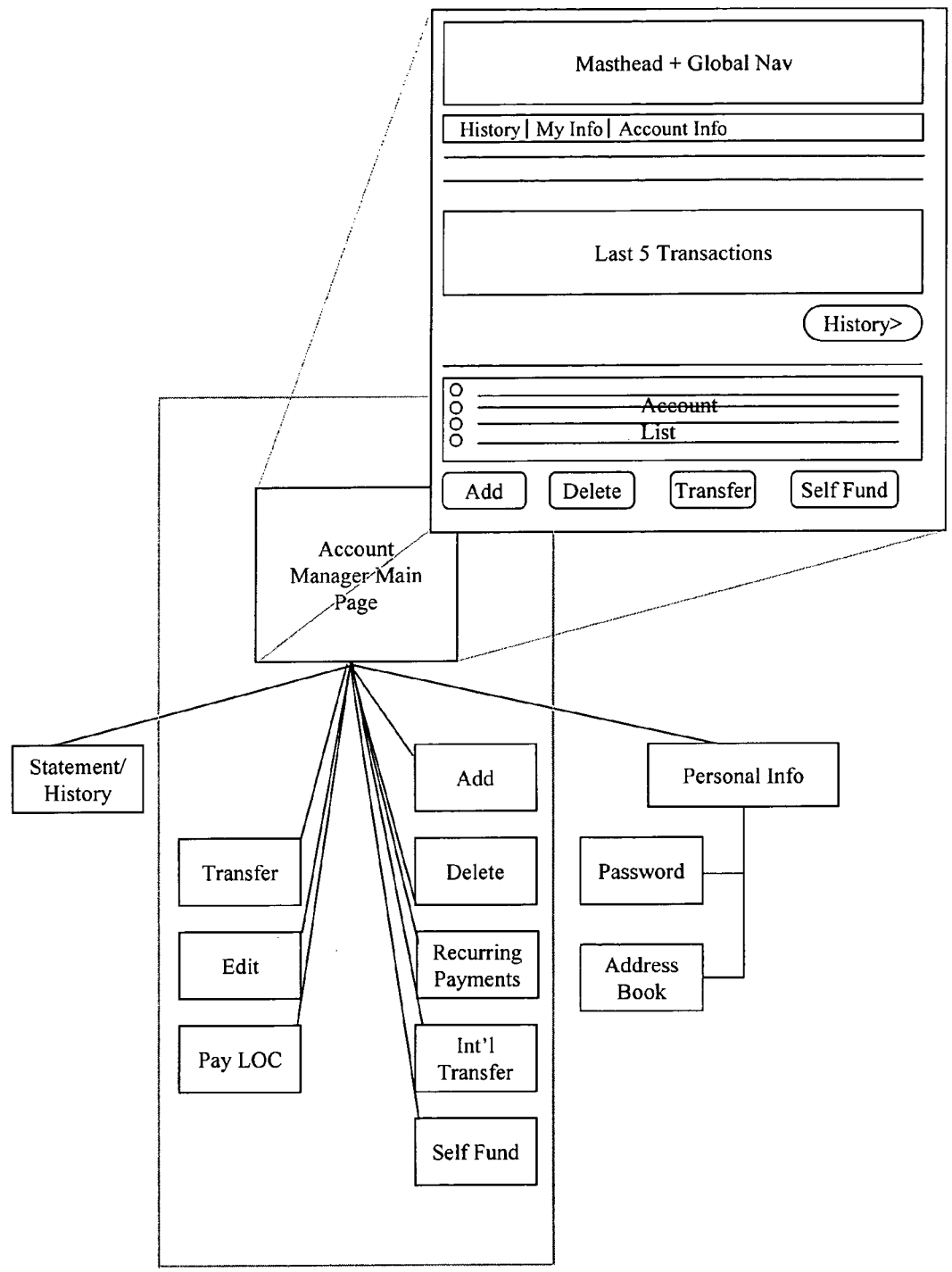
FIG. 24 is a schematic flow chart which illustrates an example of the history/statement module for an embodiment of the present invention.
Figure 25:
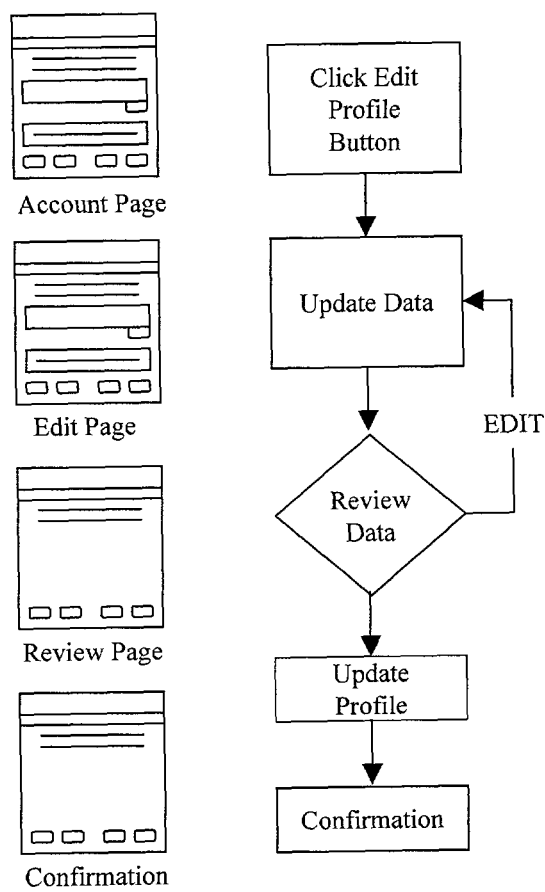
FIG. 25 is a schematic flow chart which illustrates an example of the profile update module for an embodiment of the present invention.

The function of the cancel transaction module shown in FIG. 20 is to allow the customer 10 or 14 to cancel a transaction on-line. The function of the add account module illustrated in FIG. 21 is to permit the customer 10 or 14 to add accounts, and the function of the edit account module shown in FIG. 22 is to provide options and information necessary to edit profile information or added accounts. The function of the delete account module shown in FIG. 23 is to provide options and information necessary to remove configured accounts from the profile. The function of the history/statement module illustrated in FIG. 24 is to provide summarized transaction information, and the function of the profile update module shown in FIG. 25 is to provide options and information necessary to update the user profile.

Additional features of the user interface for an embodiment of the present invention include, for example, secure messaging, a point of entry into the system, and branding. New registrations enter the system of the present invention via a variety of customized flows. Existing customers have a specific logon page which has the ability to have marketing notices posted to the customer. The system provides the customer several easy ways to come back to the service, including without limitation, cookies and/or bookmarks on the customer's browser and an icon in the browser or server tray. Specific elements of the user interface, such as graphics headers, navigational element graphics, and product names in the text, are brandable for partners.

The user interface for an embodiment of the present invention facilitate use by the lowest common denominator of Internet user. Experience indicates that Internet payments typically represent a difficult task for customers. Thus, an embodiment of the present invention includes a robust, interactive "Help" function, as well as a 24×7 electronic care (E-Care) unit by which customers can e-mail questions and receive a guaranteed, quick response. The system includes technical support from the E-Care unit, so if a customer is unable to understand a page, someone is available to walk the customer through the entire process from end to end.

An embodiment of the present invention touches several of the financial institution's systems, such as the financial institution's merchant business, which has a role as the facilitator of payments and in issuing bank credit cards. An embodiment of the present invention also leverages the financial institution ACH system as the facilitator and processor of ACH payments that customers choose to use for checking accounts. In addition, an embodiment of the present invention leverages, for example, a bank card operated accounting system of the financial institution, which is a card member transactions system, as well as the bank card's Internet system that facilitates the Internet backend.

An aspect of the present invention involves providing a service to a variety of distribution partners, such as Internet service providers, search engines, telecommunications providers, to leverage the financial institution's expertise with others' distribution. The system and method for an embodiment of the present invention can be offered in partnership, for example, between a financial institution, such as a bank, and an Internet service provider, and integrated into the service provider's classified and auction section. The system is provided in a component-like manner, which enables distribution partners to pick components of the system in a Chinese menu style by selecting, for example, one or more components from each of several columns.

Various preferred embodiments of the invention have been described in fulfillment of the various objects of the invention. It should be recognized that these embodiments are merely illustrative of the principles of the invention. Numerous modifications and adaptations thereof will be readily apparent to those skilled in the art without departing from the spirit and scope of the present invention.

What is claimed is:

1. A method for making on-line payments, comprising:
receiving enrollment information from a user for an on-line payments service;
receiving the user's designation of a source account for withdrawing funds for the on-line payments;
providing a transaction account for the user as a money deposit account accessible via a single account number that the user can use both as a source from which to send funds and a destination into which to receive funds and with at least one of a plurality of service levels, wherein the transaction account is not a checking account;
wherein providing the transaction account for the user with at least one of the plurality of service levels further comprises:
providing the transaction account for the user with a first level of service that includes an on-line person-to-person payment service enabling the user to receive funds from a party other than the user into the user's transaction account and send funds from the user's transaction account to a transaction account of a party other than the user, with a save for later feature enabling the user to accumulate a balance of funds in the user's transaction account for later use, and with a held money feature for retaining funds in the user's transaction account which the user has designated to be sent to a recipient but which has not yet been picked up by the recipient;
providing the transaction account for the user with a second level of service that includes all features of the first level of service plus an access card enabling the user to access funds in the user's transaction account for off-line transactions; and
providing the transaction account for the user with a third level of service that includes all features of the first and second levels of service plus a credit line enabling the user to access both line of credit funds and accumulated balance funds in the user's transaction account;

receiving an email address and payment amount by a payments engine for a recipient from the user at a user terminal via a network;

notifying the recipient by email at a recipient terminal by the payments engine of the payment before the recipient is enrolled at the on-line payments service;

allowing the user to have funds reside in the transaction account; and allowing the user to use the funds residing in the transaction account for at least one of making an on-line payment with funds in the transaction account, making an online purchase with funds in the transaction account, making an off-line purchase with funds in the transaction account, making a cash withdrawal with funds in the transaction account, making a credit card account payment with funds in the transaction account, making a bill payment with funds in the transaction account, and making an international payment with funds in the transaction account.

2. The method of claim 1, wherein receiving the enrollment information further comprises receiving the information from the user on an enrollment page for the on-line payments service.

3. The method of claim 2, wherein receiving the enrollment information further comprises receiving information about the user necessary to fulfill a "know your customer" (KYC) obligation of a financial institution as a provider of the on-line payments service.

4. The method of claim 3, wherein receiving the enrollment information further comprises receiving information about the user necessary to enable the financial institution to validate that the user is bona fide.

5. The method of claim 4, wherein receiving the enrollment information further comprises receiving information about the user relevant in settling disputes related to use by the user of the on-line payments service.

6. The method of claim 1, wherein receiving the user's designation of the source account further comprises receiving the user's designation of at least one of a credit card account and a deposit account of the user as the source account.

7. The method of claim 6, wherein receiving the user's designation of the credit card account as the source account further comprises receiving information from the user about the credit card account consisting of a credit card number, a credit card expiration date, and a credit card verifier.

8. The method of claim 7, wherein receiving the information from the user about the credit card account further comprises performing a back end authorization to confirm that the information relates to a valid credit card account of the user.

9. The method of claim 6, wherein receiving the user's designation of the deposit account as the source account further comprises receiving the user's designation of the deposit account consisting of a least one of a checking account, a debit account, and a money market account of the user as the source account.

10. The method of claim 9, wherein receiving the user's designation of the deposit account further comprises receiving information about the deposit account consisting of at least one of a deposit account number and an ABA number of a financial institution with which the deposit account is maintained.

11. The method of claim 10, wherein receiving the information about the deposit account further comprises performing a back end validation to confirm that the user is the owner of the designated deposit account.

12. The method of claim 1, wherein providing the transaction account for the user that includes the access card further comprises providing the access card for the user that allows the user to withdraw funds from the transaction account at a financial transaction terminal.

13. The method of claim 1, wherein allowing the user to have funds reside in the transaction account further comprises allowing the user to utilize the transaction account as a hub for user transactions.

14. The method of claim 13, wherein allowing the user to utilize the transaction account as the hub further comprises allowing the user to use the transaction account for receiving a person-to-person payment.

15. The method of claim 13, wherein allowing the user to utilize the transaction account as the hub further comprises allowing the user to fund the transaction account with funds withdrawn from the designated source account.

16. The method of claim 15, wherein allowing the user to fund the transaction account with funds withdrawn from the designated source account further comprises allowing the user to fund the transaction account with funds withdrawn from at least one of a credit card account and a deposit account as the source account.

17. The method of claim 16, wherein allowing the user to fund the transaction account with funds withdrawn from the deposit account further comprises allowing the user to fund the transaction account with funds withdrawn from the deposit account consisting of at least one of a checking account, a debit account, and a money market account as the source account.

18. The method of claim 1, wherein allowing the user to have funds reside in the transaction account further comprises allowing the user to have funds reside in at least one of a save for later portion and a held money portion of the transaction account.

19. The method of claim 18, wherein allowing the user to have funds reside in at least one of the save for later portion and the held money portion of the transaction account further comprises allowing the user to view balances of the save for later and held money portions of the transaction account.

20. The method of claim 1, wherein allowing the user to use the funds in the transaction account for making an on-line payment further comprises designating funds in the transaction account for an on-line payment to a recipient according to an instruction by the user.

21. The method of claim 1, wherein allowing the user to use the funds in the transaction account for making an on-line purchase further comprises allowing the user to authorize payment to an on-line merchant for an on-line transaction with funds in the transaction account by furnishing the on-line merchant with the transaction account number.

22. The method of claim 1, wherein allowing the user to use the funds in the transaction account for making an off-line purchase further comprises allowing the user to authorize payment to an off-line merchant for an off-line transaction with funds in the transaction account using a transaction card provided to the user in connection with the transaction account.

23. The method of claim 1, wherein allowing the user to use the funds in the transaction account for a cash withdrawal further comprises allowing the user to withdraw funds in cash from the transaction account at a self-service financial transaction terminal using a transaction card provided to the user in connection with the transaction account.

24. The method of claim 1, wherein allowing the user to use the funds in the transaction account for making a credit card account payment further comprises allowing the user to authorize a payment to the user's credit card account with funds in the transaction account according to an instruction by the user.

25. The method of claim 1, wherein allowing the user to use the funds in the transaction account for making a bill payment further comprises allowing the user to authorize the bill payment through a bill payment service with funds in the transaction account according an instruction by the user.

26. The method of claim 1, wherein allowing the user to use the funds in the transaction account for making an international payment further comprises allowing the user to authorize the international payment through an international payment service with funds in the transaction account according an instruction by the user.

27. The method of claim 1, wherein allowing the user to use the funds in the transaction account further comprises allowing the user to utilize a save for later portion of the funds in the transaction account.

28. The method of claim 27, wherein allowing the user to use the funds in the transaction account further comprises allowing the user to supplement the save for later portion of the funds in the transaction account with a line of credit associated with the transaction account.

29. A system for making on-line payments comprising:
means for receiving enrollment information from a user for an on-line payments service;
means for receiving the user's designation of a source account for withdrawing funds for the on-line payments;
means for providing a transaction account for the user as a money deposit account accessible via a single account number that the user can use both as a source from which to send funds and a destination into which to receive funds and with at least one of a plurality of service levels, wherein the transaction account is not a checking account;
wherein the plurality of service levels provided for the user with the transaction account further comprises:
a first level of service that includes an on-line person-to-person payment service enabling the user to receive funds from a party other than the user into the user's transaction account and send funds from the user's transaction account to a transaction account of a party other than the user, a save for later feature enabling the user to accumulate a balance of funds in the user's transaction account for later use, and a held money feature for retaining funds in the user's transaction account which the user has designated to be sent to a recipient but which has not yet been picked up by the recipient;
a second level of service that includes all features of the first level of service plus an access card enabling the user to access funds in the user's transaction account for off-line transactions; and
a third level of service that includes all features of the first and second levels of service plus a credit line enabling the user to access both line of credit funds and accumulated balance funds in the user's transaction account;
means for receiving an email address and payment amount by a payments engine for a recipient from the user at a user terminal via a network;
means for notifying the recipient by email at a recipient terminal by the payments engine of the payment before the recipient is enrolled at the on-line payments service;
means for allowing the user to have funds reside in the transaction account; and
means for allowing the user to use the funds residing in the transaction account for at least one of making an on-line payment with funds in the transaction account, making an on-line purchase with funds in the transaction account, making an off-line purchase with funds in the transaction account, making a cash withdrawal with funds in the transaction account, making a credit card account payment with funds in the transaction account, making a bill payment with funds in the transaction account, and making an international payment with funds in the transaction account.

30. The system of claim 29, wherein the means for receiving the enrollment information further comprises means for receiving the information from the user on an enrollment page for the on-line payments service.

31. The system of claim 30, wherein the means for receiving the enrollment information further comprises means for receiving information about the user necessary to fulfill a "know your customer" (KYC) obligation of a financial institution as a provider of the on-line payments service.

32. The system of claim 31, wherein the means for receiving the enrollment information further comprises means for receiving information about the user necessary to enable the financial institution to validate that the user is bona fide.

33. The system of claim 32, wherein the means for receiving the enrollment information further comprises means for receiving information about the user relevant in settling disputes related to use by the user of the on-line payments service.

34. The system of claim 29, wherein the means for receiving the user's designation of the source account further comprises means for receiving the user's designation of at least one of a credit card account and a deposit account of the user as the source account.

35. The system of claim 34, wherein the means for receiving the user's designation of the credit card account as the source account further comprises means for receiving information from the user about the credit card account consisting of a credit card number, a credit card expiration date, and a credit card verifier.

36. The system of claim 35, wherein the means for receiving the information from the user about the credit card account further comprises means for performing a back end authorization to confirm that the information relates to a valid credit card account of the user.

37. The system of claim 34, wherein the means for receiving the user's designation of the deposit account as the source account further comprises means for receiving the user's designation of the deposit account consisting of a least one of a checking account, a debit account, and a money market account of the user as the source account.

38. The system of claim 37, wherein the means for receiving the user's designation of the deposit account further comprises means for receiving information about the deposit account consisting of at least one of a deposit account number and an ABA number of a financial institution with which the deposit account is maintained.

39. The system of claim 38, wherein the means for receiving the information about the deposit account further comprises means for performing a back end validation to confirm that the user is the owner of the designated deposit account.

40. The system of claim 29, wherein the means for providing the transaction account for the user that includes the access card further comprises means for providing the access card for the user that allows the user to withdraw funds from the transaction account at a financial transaction terminal.

41. The system of claim 29, wherein the means for allowing the user to have funds reside in the transaction account further comprises means for allowing the user to utilize the transaction account as a hub for user transactions.

42. The system of claim 41, wherein the means for allowing the user to utilize the transaction account as the hub further comprises means for allowing the user to use the transaction account for receiving a person-to-person payment.

43. The system of claim 41, wherein the means for allowing the user to utilize the transaction account as the hub further comprises means for allowing the user to fund the transaction account with funds withdrawn from the designated source account.

44. The system of claim 43, wherein the means for allowing the user to fund the transaction account with funds withdrawn from the designated source account further comprises means for allowing the user to fund the transaction account with funds withdrawn from at least one of a credit card account and a deposit account as the source account.

45. The system of claim 44, wherein the means for allowing the user to fund the transaction account with funds withdrawn from the deposit account further comprises means for allowing the user to fund the transaction account with funds withdrawn from the deposit account consisting of at least one of a checking account, a debit account, and a money market account as the source account.

46. The system of claim 29, wherein the means for allowing the user to have funds reside in the transaction account further comprises means for allowing the user to have funds reside in at least one of a save for later portion and a held money portion of the transaction account.

47. The system of claim 46, wherein the means for allowing the user to have funds reside in at least one of the save for later portion and the held money portion of the transaction account further comprises means for allowing the user to view balances of the save for later and held money portions of the transaction account.

48. The system of claim 29, wherein the means for allowing the user to use the funds in the transaction account for making an on-line payment further comprises means for designating funds in the transaction account for an on-line payment to a recipient according to an instruction by the user.

49. The system of claim 29, wherein the means for allowing the user to use the funds in the transaction account for making an on-line purchase further comprises means for allowing the user to authorize payment to an on-line merchant for an on-line transaction with funds in the transaction account by furnishing the on-line merchant with the transaction account number.

50. The system of claim 29, wherein the means for allowing the user to use the funds in the transaction account for making an off-line purchase further comprises means for allowing the user to authorize payment to an off-line merchant for an off-line transaction with funds in the transaction account using a transaction card provided to the user in connection with the transaction account.

51. The system of claim 29, wherein the means for allowing the user to use the funds in the transaction account for a cash withdrawal further comprises means for allowing the user to withdraw funds in cash from the transaction account at a self-service financial transaction terminal using a transaction card provided to the user in connection with the transaction account.

52. The system of claim 29, wherein the means for allowing the user to use the funds in the transaction account for making a credit card account payment further comprises means for allowing the user to authorize a payment to the user's credit card account with funds in the transaction account according to an instruction by the user.

53. The system of claim 29, wherein the means for allowing the user to use the funds in the transaction account for making a bill payment further comprises means for allowing the user to authorize the bill payment through a bill payment service with funds in the transaction account according an instruction by the user.

54. The system of claim 29, wherein the means for allowing the user to use the funds in the transaction account for making an international payment further comprises means for allowing the user to authorize the international payment through an international payment service with funds in the transaction account according an instruction by the user.

55. The system of claim 29, wherein the means for allowing the user to use the funds in the transaction account further comprises means for allowing the user to utilize a save for later portion of the funds in the transaction account.

56. The system of claim 55, wherein the means for allowing the user to use the funds in the transaction account further comprises means for allowing the user to supplement the save for later portion of the funds in the transaction account with a line of credit associated with the transaction account.

57. The method of claim 1, wherein receiving the user's designation of a source account for withdrawing funds for the on-line payments further comprises receiving the user's designation of a credit card account and designating the withdrawn funds as a purchase on the credit card account by the payments engine.

58. The method of claim 1, wherein allowing the user to use the funds in the transaction account for making an on-line payment further comprises:
   prompting the recipient by the payments engine to enroll for the on-line payments service;
   if the recipient elects to enroll, receiving the recipient's designation of a recipient account to receive the payment and applying the payment amount to the recipient account by the payments engine; and
   if the recipient declines to enroll, arranging a courtesy check for the payment amount to the recipient by the payments engine.

59. The method of claim 58, wherein receiving the recipient's designation of a recipient account and applying the payment amount to the recipient account further comprises receiving the recipient's designation of a recipient credit card account and applying the payment amount as a payment on the recipient credit card account.

60. The method of claim 1, wherein allowing the user to use the funds in the transaction account for making an international payment further comprises:
   receiving a selection via a network by the payments engine from the user at the user terminal of an option for the international payment;
   receiving a selection from the user by the payments engine of one of a payment by wire and a payment by check in response to a prompt by the payments engine;
   if the user selects the payment by wire, receiving banking and wire settlement information by the payments engine from the user in response to a prompt by the payments engine;
   if the user selects the payment by check, receiving information concerning a recipient, a country, a currency, and a payment amount from the user in response to a prompt by the payments engine; and displaying an exchange rate and fee for the payment for the user at the terminal by the payments engine via the network.

61. A method for making on-line payments, comprising:

receiving enrollment information by a payments engine from a user at a terminal via a network for an on-line payments service;

identifying characteristics of the user from the enrollment information indicative of a predefined service level for the user by the payments engine;

appending a level indicator for the user by the payments engine to an enrollment file for the user corresponding to the predefined service level for the user;

receiving the user's designation of a source account for withdrawing funds for the on-line payments service for the user by the payments engine via the network;

providing a transaction account for the user by the payments engine accessible via a single account number that the user can use both as a source from which to send funds and a destination into which to receive funds and with a user service level and graphical user interface corresponding to the appended level indicator, wherein the transaction account is not a checking account; and allowing the user to use the transaction account for a transaction via the payments engine in response to prompts displayed on the graphical user interface for the user at the terminal according to predetermined transaction parameters established for the user service level;

wherein the predefined service levels comprise:

a first level of service that includes an online person-to-person payment service enabling the user to receive funds from a party other than the user into the user's transaction account and send funds from the user's transaction account to a transaction account of a party other than the user, with a save for later feature enabling the user to accumulate a balance of funds in the user's transaction account for later use, and with a held money feature for retaining funds in the user's transaction account which the user has designated to be sent to a recipient but which has not yet been picked up by the recipient, a second level of service that includes all features of the first level of service plus an access card enabling the user to access funds in the user's transaction account for off-line transactions, and a third level of service that includes all features of the first and second levels of service plus a credit line entitling the user to access both line of credit funds and accumulated balance funds in the user's transaction account;

receiving an email address and payment amount by a payments engine for a recipient from the user at a user terminal via a network; and notifying the recipient by email at a recipient terminal by the payments engine of the payment before the recipient is enrolled at the on-line payments service.

62. A method for making on-line payments, comprising:

receiving enrollment information for an on-line payments service from a user on an enrollment page for the on-line payments service;

receiving from the user the user's designation of a source account for withdrawing funds for the on-line payments service;

providing a transaction account for the user by the on-line payments service as a money deposit account accessible via a single account number that the user can use both as a source from which to send funds and a destination into which to receive funds and with at least one of a plurality of service levels, wherein the transaction account is not a checking account;

allowing the user to have funds reside in at least one of a save for later portion of the transaction account and a held money portion of the transaction account;

allowing the user to use the funds residing in the transaction account for a transaction consisting of any of making an on-line payment via a recipient account with funds in the transaction account, making an on-line purchase with funds in the transaction account by authorizing payment from the transaction account to an on-line merchant, making a credit card account payment with funds in the transaction account by authorizing the payment to the user's credit card account, making a bill payment via a bill payment service with funds in the transaction account, making an international payment via an international payment service in a foreign currency with funds in the transaction account, making an offline purchase with funds in the transaction account by authorizing payment from the transaction account to an off-line merchant using a transaction card provided to the user in connection with the transaction account, making a cash withdrawal with funds in the transaction account at a self-service financial transaction terminal using the transaction card, and receiving funds from a party other than the user into the transaction account;

providing the user with a credit facility to supplement the save for later portion of the funds in the transaction account for use in any of said transactions, wherein the credit facility is accessible by the user only upon depleting the save for later portion of the funds in the transaction account;

receiving from the user an email address and payment amount by a payments engine for a recipient from the user at a user terminal via a network; and notifying the recipient by email at a recipient terminal by the payments engine of the payment before the recipient is enrolled at the on-line payments service.

\* \* \* \* \*